(12) United States Patent
Culbertson et al.

(10) Patent No.: US 7,665,890 B2
(45) Date of Patent: Feb. 23, 2010

(54) TEMPERATURE SENSOR ASSEMBLY AND METHOD OF MANUFACTURING THEREOF

(75) Inventors: David P. Culbertson, Bristol, WI (US); Daniel D. Harvey, Lake Geneva, WI (US); Robert K. Frake, Wonder Lake, IL (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 201 days.

(21) Appl. No.: 11/767,362

(22) Filed: Jun. 22, 2007

(65) Prior Publication Data

US 2008/0025372 A1 Jan. 31, 2008

Related U.S. Application Data

(60) Provisional application No. 60/815,620, filed on Jun. 22, 2006.

(51) Int. Cl.
*G01K 1/00* (2006.01)
(52) U.S. Cl. ...................................... 374/100
(58) Field of Classification Search ................. 374/185, 374/139, 126, 166, 100
See application file for complete search history.

(56) References Cited

U.S. PATENT DOCUMENTS

| | | | |
|---|---|---|---|
| 3,934,786 A | 1/1976 | Kozak et al. | |
| 3,954,507 A | 5/1976 | Carter | |
| 3,963,316 A | 6/1976 | Williams | |
| 3,984,912 A | 10/1976 | Johnston et al. | |
| 3,994,552 A | 11/1976 | Selvin | |
| 4,039,244 A | 8/1977 | Leachy | |
| 4,066,325 A | 1/1978 | Pearce, Jr. et al. | |
| 4,072,394 A | 2/1978 | Waldron et al. | |
| 4,120,556 A | 10/1978 | Waldron et al. | |
| 4,129,351 A | 12/1978 | Sugimoto et al. | |
| 4,152,578 A | 5/1979 | Jacobs | |
| 4,206,958 A | 6/1980 | Hall et al. | |
| 4,223,968 A | 9/1980 | Kawabata et al. | |
| 4,252,397 A | 2/1981 | Eigenbrode et al. | |
| 4,258,974 A | 3/1981 | Kuo et al. | |
| 4,262,983 A | 4/1981 | Bogese, II | |
| 4,273,407 A | 6/1981 | Snuffer et al. | |
| 4,315,662 A | 2/1982 | Greenwood et al. | |
| 4,332,430 A | 6/1982 | Clark | |
| 4,343,523 A | 8/1982 | Cairns et al. | |
| 4,352,538 A | 10/1982 | Fowler | |
| 4,392,703 A | 7/1983 | Hall et al. | |
| 4,417,395 A | 11/1983 | Hall et al. | |

(Continued)

OTHER PUBLICATIONS

U.S. Appl. No. 11/767,373, filed Jun. 22, 2007, Frake, et al.

*Primary Examiner*—Andre J Allen
(74) *Attorney, Agent, or Firm*—Brinks Hofer Gilson & Lione

(57) ABSTRACT

A temperature sensor assembly and method of manufacturing thereof having a temperature probe, a mounting connector, a wire set, a transition component, a housing, and a circuit is provided. The temperature probe includes a probe body, a temperature sensor and at least one conductor configured for providing a temperature signal indicative of a temperature over the at least one conductor. The circuit is enclosed within the housing and configured for receiving the temperature signal from the temperature probe and generating the temperature characteristic in response to the received temperature signal.

25 Claims, 32 Drawing Sheets

U.S. PATENT DOCUMENTS

| | | | |
|---|---|---|---|
| 4,431,252 A | 2/1984 | Cairns et al. | |
| 4,457,570 A | 7/1984 | Bogese, II | |
| 4,461,530 A | 7/1984 | Brush, Sr. et al. | |
| 4,470,100 A | 9/1984 | Rebaudo et al. | |
| 4,517,625 A | 5/1985 | Frink et al. | |
| 4,533,202 A | 8/1985 | Pohl | |
| 4,538,623 A | 9/1985 | Proctor et al. | |
| 4,556,265 A | 12/1985 | Cunningham | |
| 4,579,406 A | 4/1986 | Laursen et al. | |
| 4,581,478 A | 4/1986 | Pugh et al. | |
| 4,598,963 A | 7/1986 | White et al. | |
| 4,641,901 A | 2/1987 | Brennan et al. | |
| 4,695,112 A | 9/1987 | Maston et al. | |
| 4,707,657 A | 11/1987 | Boegh-Petersen | |
| 4,717,217 A | 1/1988 | Bogese, II | |
| 4,726,775 A | 2/1988 | Owen | |
| 4,833,402 A | 5/1989 | Boegh-Petersen | |
| 4,868,967 A | 9/1989 | Holt et al. | |
| 4,871,319 A | 10/1989 | Babow | |
| 4,871,326 A | 10/1989 | Coon | |
| 4,875,865 A | 10/1989 | Demlelr, Jr. et al. | |
| 4,894,906 A | 1/1990 | Huang | |
| 4,900,258 A | 2/1990 | Hnatuck et al. | |
| 4,912,772 A | 3/1990 | Beaudry, Jr. et al. | |
| 4,922,607 A | 5/1990 | Doan et al. | |
| 4,939,454 A | 7/1990 | Miner | |
| 4,985,000 A | 1/1991 | Tengler et al. | |
| 5,046,952 A | 9/1991 | Cohen et al. | |
| 5,070,597 A | 12/1991 | Holt et al. | |
| 5,171,166 A | 12/1992 | Sato et al. | |
| 5,188,536 A | 2/1993 | Ganthier et al. | |
| 5,200,574 A | 4/1993 | Cunningham et al. | |
| 5,214,243 A | 5/1993 | Johnson | |
| 5,215,471 A | 6/1993 | Reymond et al. | |
| 5,241,910 A | 9/1993 | Cunningham et al. | |
| 5,266,903 A | 11/1993 | Foster | |
| 5,302,934 A | 4/1994 | Hart et al. | |
| 5,364,186 A * | 11/1994 | Wang et al. | 374/126 |
| 5,369,225 A | 11/1994 | Natwig et al. | |
| 5,370,459 A * | 12/1994 | Culbertson et al. | 374/179 |
| 5,370,554 A | 12/1994 | Koyasu | |
| 5,393,932 A | 2/1995 | Young et al. | |
| 5,486,113 A | 1/1996 | Lundh | |
| 5,491,321 A | 2/1996 | Stuart et al. | |
| 5,533,901 A | 7/1996 | Hunt et al. | |
| 5,609,491 A | 3/1997 | Cooper et al. | |
| 5,618,109 A * | 4/1997 | Culbertson | 374/179 |
| 5,649,974 A | 7/1997 | Nelson et al. | |
| 5,676,694 A | 10/1997 | Boser et al. | |
| 5,728,149 A | 3/1998 | Laske et al. | |
| 5,730,607 A | 3/1998 | Darty | |
| 5,791,919 A | 8/1998 | Brisson et al. | |
| 5,795,196 A | 8/1998 | Hotea et al. | |
| 5,853,020 A | 12/1998 | Widner | |
| 5,857,259 A | 1/1999 | Johnston | |
| 5,865,631 A | 2/1999 | Berto et al. | |
| 5,878,851 A | 3/1999 | Carlson et al. | |
| 5,944,539 A | 8/1999 | Ernolf et al. | |
| 5,947,754 A | 9/1999 | Lin | |
| 5,954,759 A | 9/1999 | Swoyer et al. | |
| 5,982,253 A | 11/1999 | Perrin et al. | |
| 6,004,168 A | 12/1999 | Fuchs et al. | |
| 6,017,238 A | 1/2000 | Johnston | |
| 6,036,508 A | 3/2000 | Anderson et al. | |
| 6,055,725 A | 5/2000 | Berto et al. | |
| 6,126,494 A | 10/2000 | Fuchs et al. | |
| 6,135,829 A | 10/2000 | Johnston | |
| 6,171,150 B1 | 1/2001 | Saito et al. | |
| 6,217,373 B1 | 4/2001 | Johnston | |
| 6,230,406 B1 | 5/2001 | Balfour et al. | |
| 6,261,137 B1 | 7/2001 | Wilcox | |
| 6,283,778 B1 | 9/2001 | Kupnicki et al. | |
| 6,312,280 B1 | 11/2001 | Stevenson | |
| D454,333 S | 3/2002 | Ikeda et al. | |
| D454,335 S | 3/2002 | Okada | |
| 6,372,990 B1 | 4/2002 | Saito et al. | |
| 6,384,335 B1 | 5/2002 | Saito et al. | |
| 6,388,866 B1 | 5/2002 | Rorvick et al. | |
| 6,428,332 B1 | 8/2002 | Nakamura et al. | |
| 6,431,750 B1 * | 8/2002 | Haberbusch et al. | 374/166 |
| 6,447,305 B1 | 9/2002 | Roberts | |
| 6,491,530 B2 | 12/2002 | Koide et al. | |
| 6,530,787 B2 | 3/2003 | Harting et al. | |
| 6,533,615 B2 | 3/2003 | Koide et al. | |
| 6,540,556 B1 | 4/2003 | Fu | |
| 6,565,385 B1 | 5/2003 | Anderson et al. | |
| 6,565,386 B1 | 5/2003 | Yoneyama et al. | |
| 6,603,654 B2 | 8/2003 | Rorvick et al. | |
| 6,617,939 B1 | 9/2003 | Vermeersch | |
| 6,643,546 B2 | 11/2003 | Mathis et al. | |
| 6,682,361 B2 | 1/2004 | Zweigle | |
| 6,683,450 B2 | 1/2004 | Rick et al. | |
| D486,794 S | 2/2004 | Okamoto | |
| 6,772,505 B1 | 8/2004 | Logan et al. | |
| 6,785,576 B2 | 8/2004 | Verness | |
| 6,795,729 B1 | 9/2004 | Breyen et al. | |
| 6,851,956 B2 | 2/2005 | Saka et al. | |
| 6,906,541 B2 | 6/2005 | Kimura | |
| 6,963,482 B2 | 11/2005 | Breyen et al. | |
| 7,312,690 B1 * | 12/2007 | Geer | 338/22 R |
| 2004/0002822 A1 * | 1/2004 | Keck | 702/55 |
| 2004/0086215 A1 * | 5/2004 | Salerno et al. | 385/12 |
| 2005/0069018 A1 * | 3/2005 | Hosler et al. | 374/139 |

\* cited by examiner

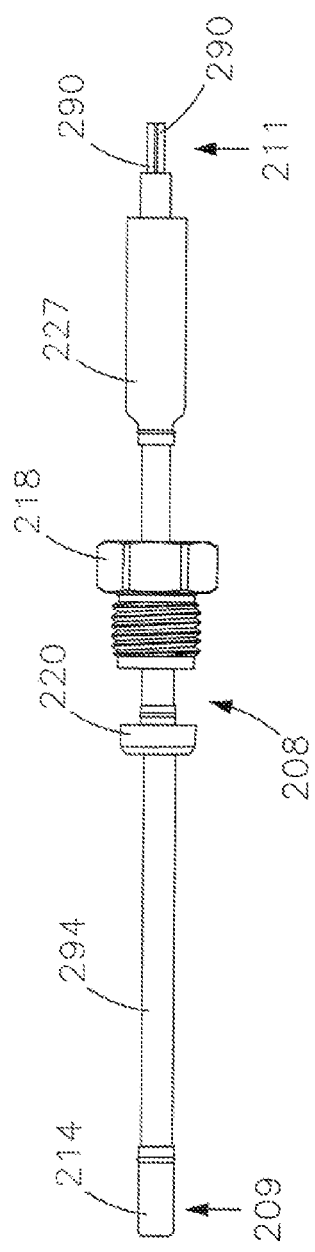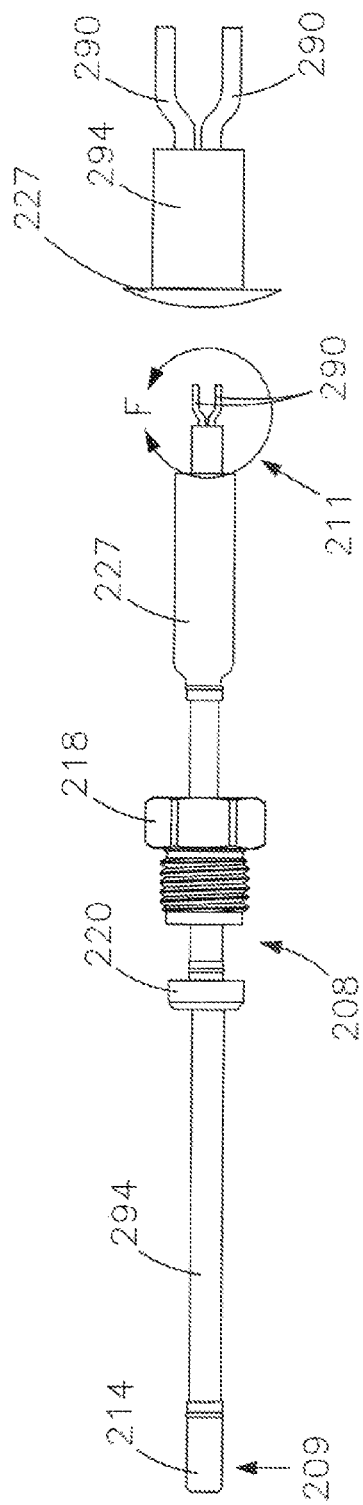
FIG. 10D
FIG. 10E
FIG. 10F

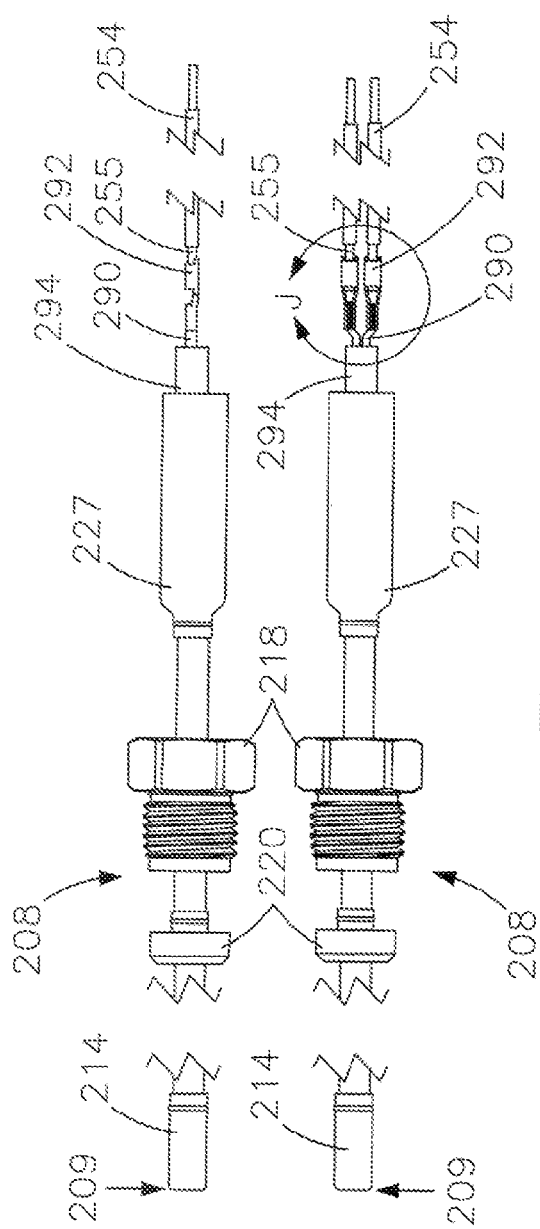
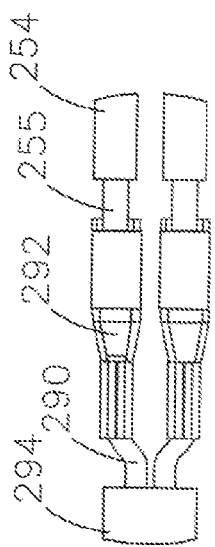
FIG. 10I
FIG. 10J

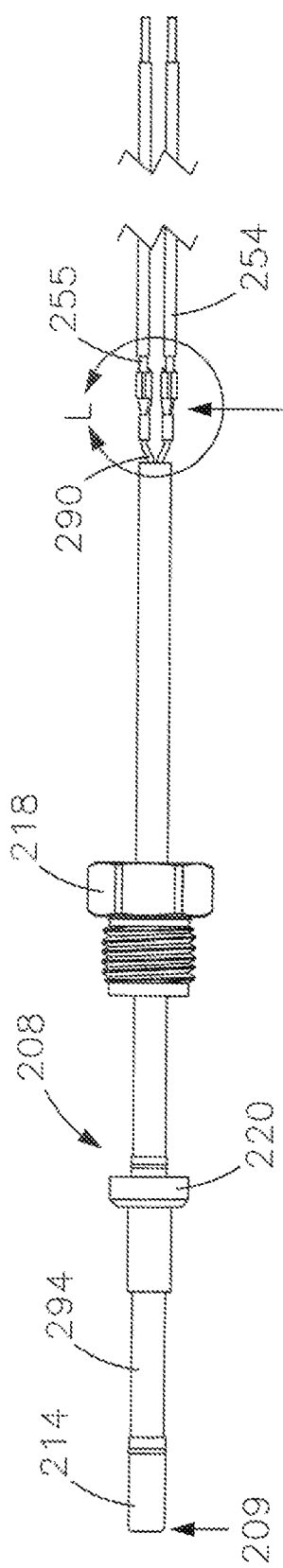
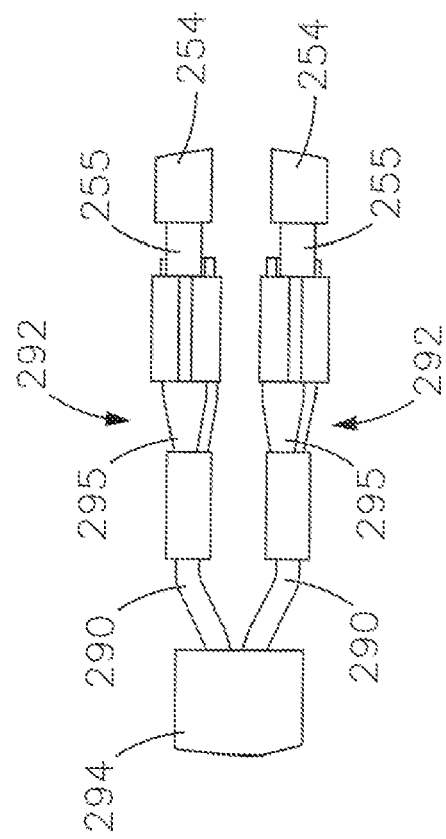
FIG. 10K
FIG. 10L

TEMPERATURE SENSOR ASSEMBLY AND METHOD OF MANUFACTURING THEREOF

CROSS-REFERENCE TO RELATED APPLICATIONS

This application claims the benefit of U.S. Provisional Application No. 60/815,620, filed on Jun. 22, 2006. The disclosure of the above provisional application is incorporated herein by reference in its entirety.

FIELD

The present disclosure relates to sensors and, more specifically, to temperature sensor assemblies having one or more temperature sensors and the method of manufacturing such temperature sensor assemblies.

BACKGROUND

The statements in this section merely provide background information related to the present disclosure and may not constitute prior art.

Sensors are used in a wide variety of operational environments to monitor operating and environmental characteristics. These sensors can include temperature, pressure, velocity, position, motion, current, voltage, and impedance sensors, by way of example. They are placed in or associated with the operational environment being monitored and are designed for generating an electrical signal or having an electrical characteristic such as an impedance, voltage or current that varies in response to the changes in values as the monitored operating or environment characteristic changes.

Temperature sensing probes include numerous components, such as, for example, a temperature sensing element, various wiring, resistors, diodes, and switches, among others. Generally, the temperature sensing probe is subjected to harsh environments that easily can damage the components of the temperature sensing probe. Furthermore, the temperature sensing probe is subject to mechanical stress due to vibration from surrounding machinery. To reduce the potential for damage to the probe from environmental and mechanical stress, various packaging schemes have been implemented to protect the measuring circuitry of the probe. However, such packaging schemes and the methods that are used for manufacturing often result in premature failure or a reduction in performance of the temperature sensing probe.

SUMMARY

The present disclosure generally includes temperature sensor assemblies and methods of manufacturing temperature sensor assemblies that are capable of improved performance in harsh temperature sensing environments and that are cost effective to manufacture.

According to one aspect, a temperature sensor assembly including a temperature probe, a mounting connector, a wire set, a transition component, a housing and a circuit, the temperature probe includes a probe body, a temperature sensor and at least one conductor configured for providing a temperature signal indicative of a temperature over the at least one conductor, the mounting connector is adapted for securing the probe body to a mounting assembly, the wire set having at least one wire corresponding to each of the at least one conductors, each wire having a first end and a second end, the transition component adapted for coupling each of the at least one conductors to a first end of the at least one wire of the wire set, the housing having an input for receiving a second end of the wires of the wire set and an output for coupling to a temperature measurement system and providing a temperature characteristic, and the a circuit enclosed within the housing and configured for receiving the temperature signal from the temperature probe and generating the temperature characteristic in response to the received temperature signal.

According to another aspect, a temperature sensor assembly including a first temperature sensor probe, a second temperature sensor probe, and an adaptor circuit assembly, the first sensor probe having a first temperature sensor and one or more first conductors coupled to the first temperature sensor and configured for providing a first temperature signal indicative of a first temperature; the second sensor probe having a second temperature sensor and one or more second conductors coupled to the second temperature sensor and configured for providing a second temperature signal indicative of a second temperature, and the adaptor circuit assembly fixedly coupled directly to one or more of the conductors of the first temperature sensor probe and one or more of the conductors of the second temperature sensor probe and having a first input for receiving the first temperature signal and a second input for receiving the second temperature signal, and an output for coupling to a temperature measurement system and providing a first temperature characteristic and a second temperature characteristic, and a circuit configured for receiving the first temperature signal and generating the first temperature characteristic in response to the first temperature signal and receiving the second temperature signal and generating the second temperature characteristic in response to the second temperature signal.

According to yet another aspect, a method for manufacturing a thermocouple sensor assembly includes attaching a first wire to a first end of a first conductor, attaching a second wire to a first end of a second conductor, placing a grommet having a first channel over the attachment of the first wire to the first conductor and having a second channel over the attachment of the second wire to the second conductor, placing a transition body over the first and second conductors and about the grommet for securing the grommet and attachments within a cavity of the transition body, joining a first end of the first conductor to a first end of the second conductor to form a thermocouple junction at a second end of the conductors, attaching the transition body to a second end of the probe body, positioning a mounting connector about the outer surface of the probe body between the first end and the second end of the probe body, attaching a collar to an intermediate outer surface of the probe body between the first end of the probe body and the mounting connector, attaching a second end of the first wire to a circuit board, and attaching a second end of the second wire to the circuit board.

According to still another aspect, a method for manufacturing a thermocouple sensor assembly includes stripping a first end of a mineral insulated cable to expose a first conductor and a second conductor, forming a thermocouple junction at a second end of the mineral insulated cable, attaching a collar about an intermediate portion of the probe body, enclosing the second end of the probe body, positioning a mounting connector about an outer surface of the probe body between the first end of the probe body and the collar, placing a transition body over the first end of the probe body, attaching a first wire to the exposed first conductor and the second wire to the exposed second conductor, placing a grommet having a first channel over the attachment of the first wire to the first conductor and having a second channel over the attachment of the second wire to the second conductor, attaching the transition body in a position proximate to the first end of the probe body with the transition body substantially covering the grommet, attaching a second end of the first wire to a circuit board, and attaching a second end of the second wire to the circuit board.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

DRAWINGS

The drawings described herein are for illustration purposes only and are not intended to limit the scope of the present disclosure in any way.

FIGS. 7A to 7L are sequential assembly perspective views illustrating one method of assembling a temperature probe in accordance with the principles of the present disclosure;

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

Figure 1:
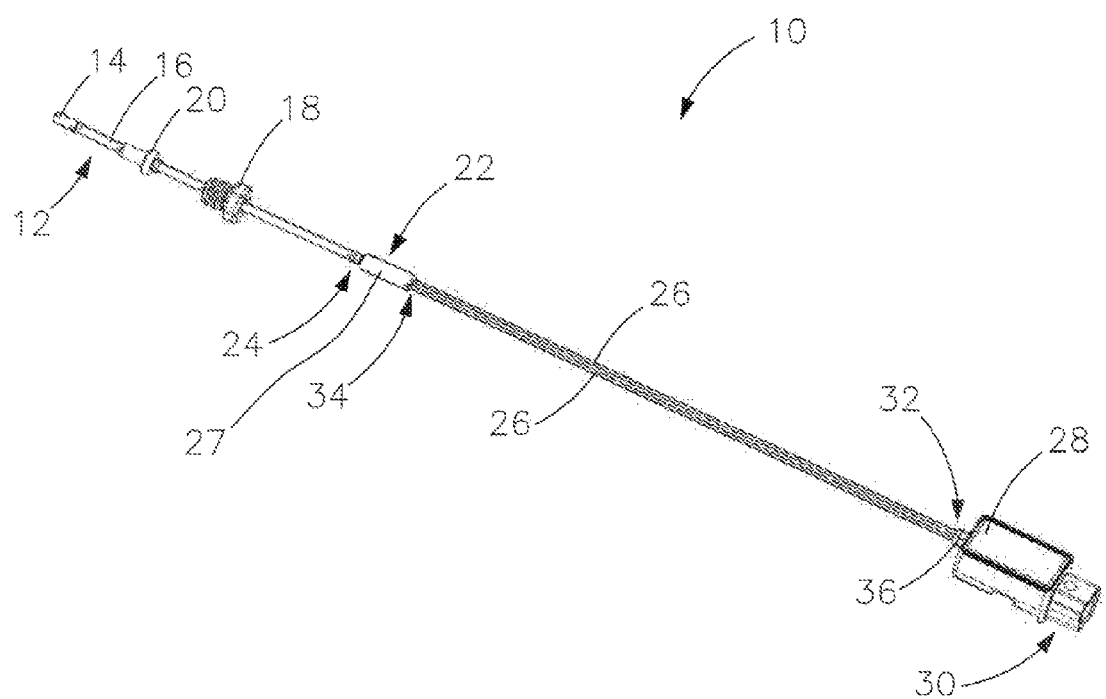
FIG. 1 is a perspective view of a temperature sensor assembly having a single temperature probe and constructed in accordance with the principles of the present disclosure.

Referring to FIG. 1, a temperature sensor assembly according to the present disclosure is illustrated and generally indicated by reference numeral 10. The temperature sensor assembly 10 generally includes a temperature probe 12, which includes a tip cap 14 (preferably a metal alloy) at one end of a probe body 16 (preferably mineral insulated (MI) cable). A mounting connector 18 is secured to the probe body 16, and a collar 20 is positioned between the tip cap 14 and the mounting connector 18. A transition component 22 covers a second end 24 of the probe body 16 and comprises a transition body 27 encapsulating a grommet 23 (not shown in FIG. 1; see FIG. 5). The grommet has two channels that enclose connectors that terminate conductors of the temperature probe 12 to lead wires 26. The specific details of the grommet, its channels, the connectors, and the conductors are illustrated and described in greater detail below.

A housing 28 receives the lead wires 26 and includes an output portion 30 for coupling to a temperature measurement system and providing a temperature characteristic. A circuit assembly (not shown) is enclosed within the housing 28 and is configured for receiving the temperature signal from the temperature probe 12 and generating a temperature characteristic in response to the received temperature signal.

The temperature probe 12 can include a mineral insulated (MI) cable 16 having one or more conductors contained therein or can be a conductor surrounded by a conductor such as a compressed powder. The MI cable can include one or two resistance heating elements or conductors embedded in highly compressed magnesium oxide covered by a copper or an Alloy 825 stainless steel sheath, by way of example. The specification of the MI cable 16 is based, at least in part, on the application requirements and associated conductivity, resistance and sheath material.

The mounting connector 18 is adapted for securing the temperature probe 12 to a mounting assembly in an operating environment. Such an arrangement can be as simple as a hanger or can include a nut, flange, rotatable connector, or other device. For example, in some embodiments, the mounting connector 18 includes a sealing ring or collar 20 for placing the temperature sensor within a temperature sensing environment that is then sealed by the mounting connector 18. In one embodiment, the mounting connector 18 can be a powder metal high strength nut (in the form of a hex nut or other geometry). In such embodiments, the power metal nut can provide for cost effectively securing the temperature probe 12 in a hostile or enclosed environment, such as within an engine, power plant, fluid flow, or chemical process, by way of example.

The lead wires 26 include one or more wires that correspond to one or more of the conductors within the temperature probe 12. Each lead wire 26 includes a first end 32 and a second end 34 and can be stranded or solid wires, among others. The transition component 22 is adapted for coupling or aiding in the coupling each of the conductors to an end of lead wire 26, as described in greater detail below.

The housing 28 also includes an input portion 36 for receiving an end of the lead wires 26. The output portion 30 of the housing 28 couples to a temperature measurement system and provides one or more temperature characteristics. A circuit assembly (not shown) is enclosed within the housing 28 and is configured for receiving the temperature signal from one or more temperature probes 12 (and/or temperature sensors) and generating temperature characteristics in response to the received temperature signals.

The temperature sensor can be any type of sensor including a thermocouple, a thermistor, or resistance temperature detector. In one example, the sensor is a thermocouple that can be formed by coupling the conductors (ungrounded thermocouple) or coupling to the probe body (grounded thermocouple). The temperature signal typically can include a voltage level generated by the thermocouple. In such an example embodiment, a cold junction compensation circuit can be implemented within the probe assembly or within the circuit or housing 28. The generated temperature characteristic can be any characteristic desired and practical for providing information as a function of the temperature signal and as required or desired by the application. For instance, this can include a resistance value, a frequency, a digital pulse stream, a current, an impedance, or a voltage.

The circuit assembly receives the one or more temperature signals from one or more sensors and/or temperature probes 12 and can generate an output signal or characteristic in response to the signals. These output characteristics can include a ratiometric analog voltage signal (RAVS), a pulse width modulated signal, a variable frequency signal, a variable output impedance, a variable voltage signal, and a variable current signal, by way of example.

In some embodiments, the circuit assembly can be configured for generating a digital signal including the temperature characteristic, wherein the circuit and the housing are each adapted for coupling to an connected component, network, instrument or controller, such as an engine control module. For example, they can be adapted for communication over any well known digital or analog communication facility including a wired or wireless connection. Additionally, by way of example but not intended to be limited thereto, this can include communication protocols such as a controller area network (CAN). CAN is just one example of a well known and widely used communication protocol that can be implemented by the circuit and the housing. Additionally, proprietary interfaces and communications protocols can also be implemented. The circuit assembly and further details of the housing are described in greater detail in copending application titled "Sensor Adaptor Circuit Housing Assembly and Method of Manufacturing Thereof," filed concurrently herewith on Jun. 22, 2007, which is commonly assigned with the present application and the contents of which are incorporated herein by reference in their entirety.

Figure 2A:
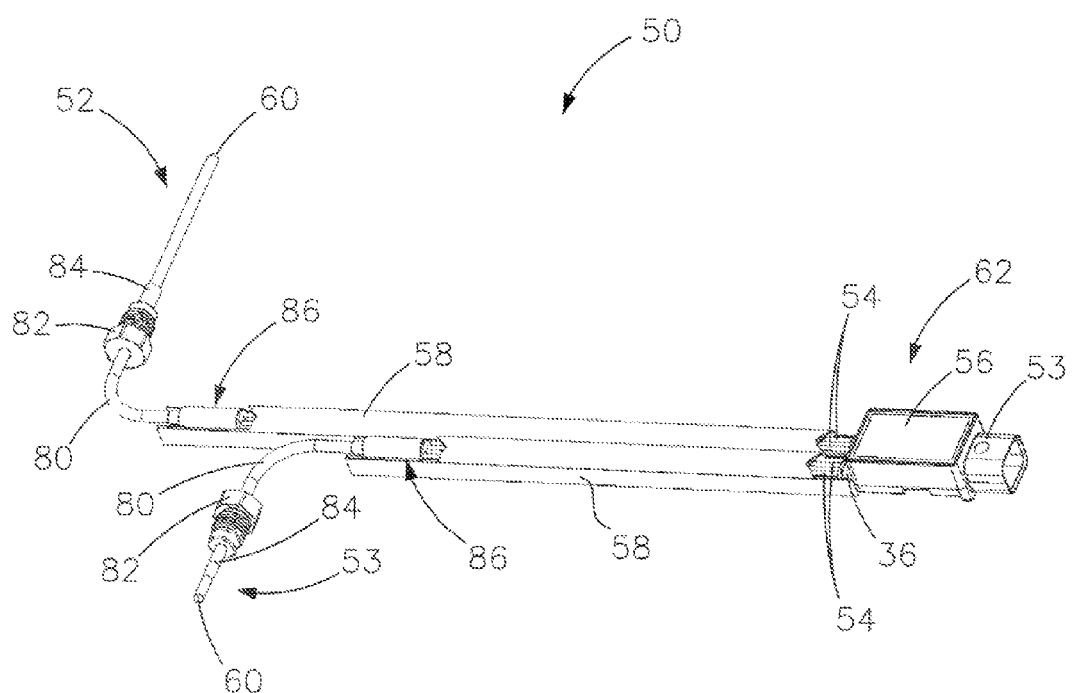
FIG. 2A is a perspective view of a temperature sensor assembly having dual temperature probes and lead covers constructed in accordance with the principles of the present disclosure.
Figure 2B:
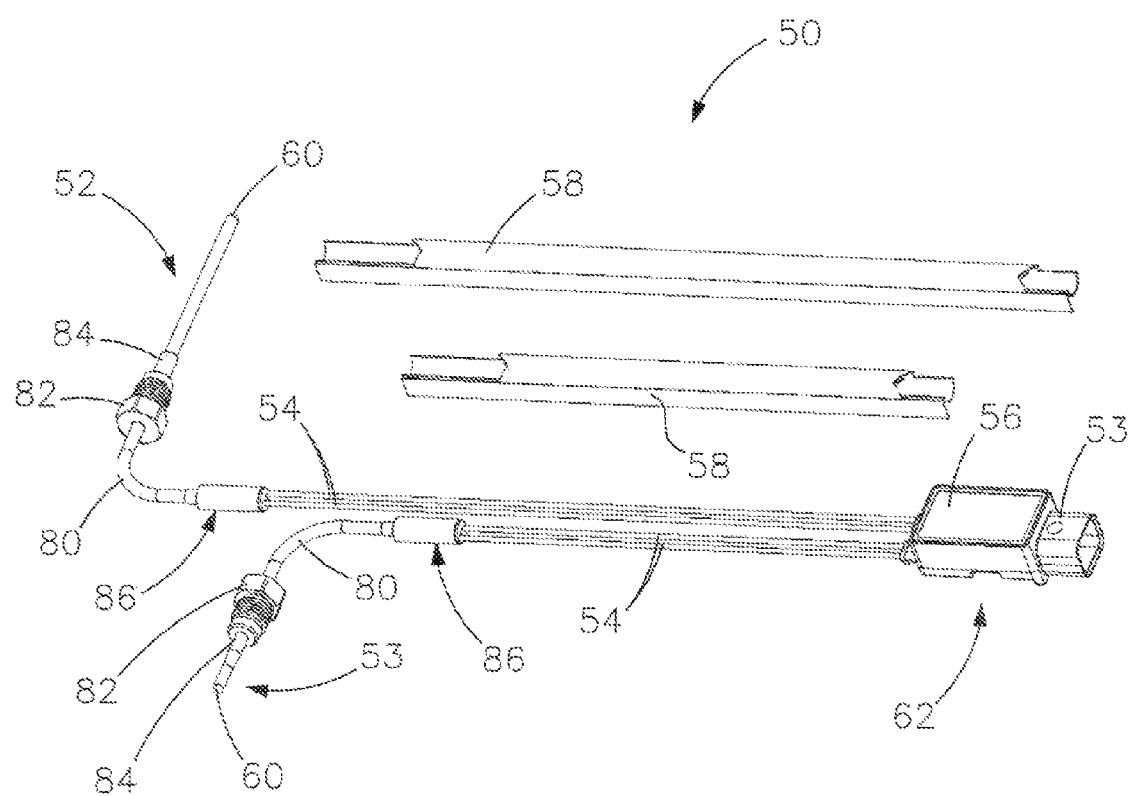
FIG. 2B is a partially exploded perspective view of the temperature sensor assembly having dual temperature probes of FIG. 2A in accordance with the principles of the present disclosure.

Referring now to FIGS. 2A and 2B, another form of a temperature sensor assembly constructed in accordance with the principles of the present disclosure is illustrated and generally indicated by reference numeral 50. In this form, the lead wires 54 are contained within protective lead covers 58, and the tip caps 60 are in an opposed relationship to sense the temperature of two different areas. Accordingly, the temperature sensor assembly 50 includes a first sensor probe 52, a second sensor probe 53, and an adaptor circuit assembly 62. Each sensor probe 52, 53 can include a probe body, such as a cable 80, containing a temperature sensor (not shown) and one or more conductors coupled to the temperature sensor. Each sensor probe 52, 53 is configured for providing one or more temperature signals indicative of a temperature about an exterior portion of the sensor probe 52, 53. The adaptor circuit assembly 62 includes inputs for receiving the temperature signals and an output 53 for coupling to a temperature measurement system and providing one or more temperature characteristics responsive to the received temperature signals. A circuit is enclosed within the housing 56 and is configured with electronic circuit components and software such as computer executable instructions for receiving the temperature signals and generating the temperature characteristics in response to one or more temperature signals.

As shown in FIG. 2B, the lead covers 58 can be removed in some embodiments as this cover is optional. The lead covers 58 can cover all or only a portion of the leads between the temperature probes 12 and housing 56. With reference to FIG. 2A, the lead covers 58 are shown extending from the housing 56, past the transition components 86, and to an area near the collars 84.

Figure 3A:
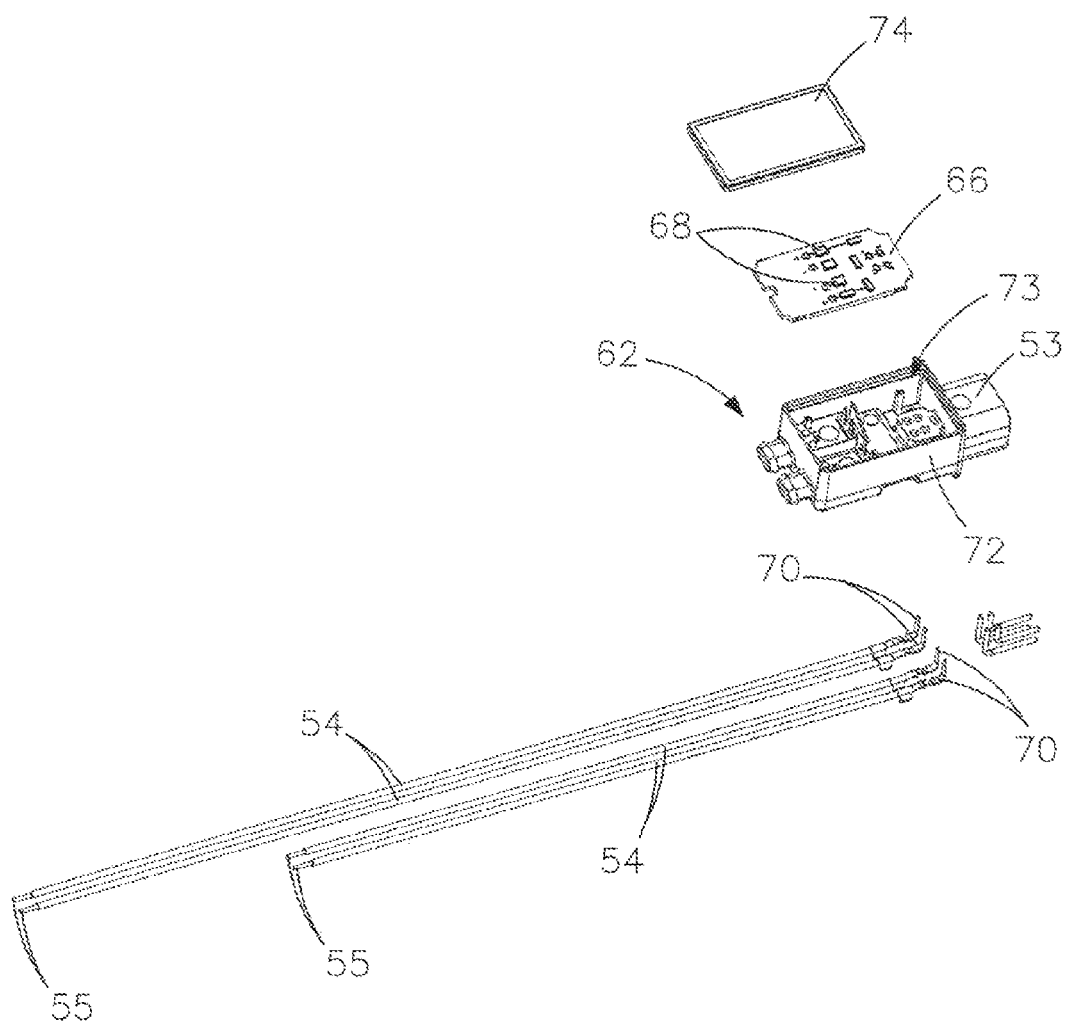
FIG. 3A is an exploded perspective view of an adaptor circuit assembly and lead wires for a temperature sensor assembly constructed in accordance with the principles of the present disclosure.
Figure 3B:
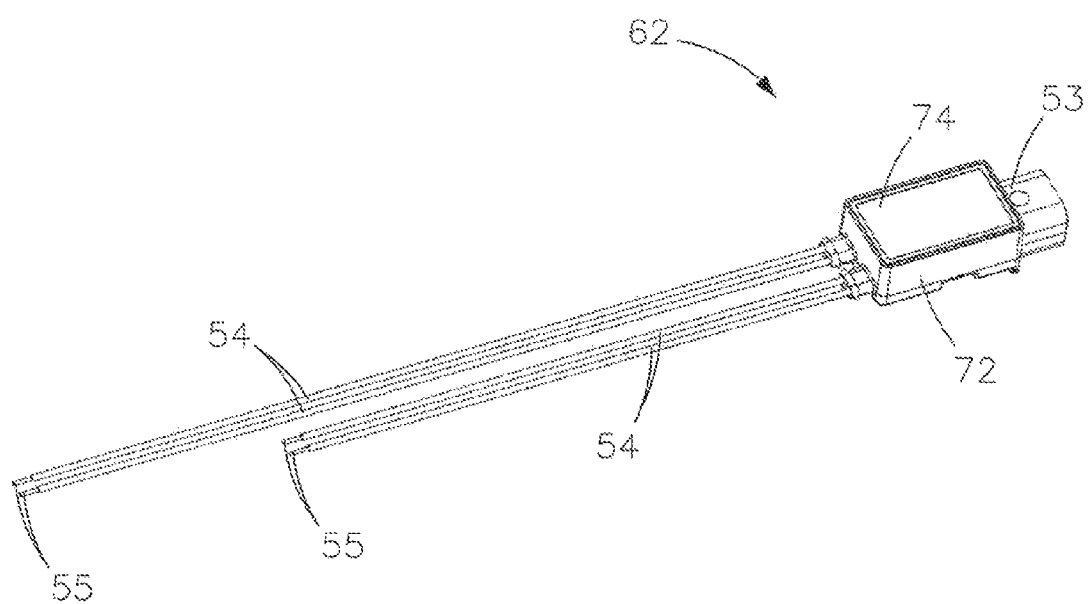
FIG. 3B is a perspective view of the adaptor circuit assembly and connected lead wires of FIG. 3A in accordance with the principles of the present disclosure.

As shown in FIGS. 3A and 3B, an adaptor circuit assembly 62 is assembled from dual lead wires 54 that lead to connectors 70, which pass through the housing base 72 and into a cavity 73 formed in the housing base 72. The connectors 70 are in electrical contact with the circuit board 66 and its circuit components 68 in order to provide the temperature signals as previously set forth. Also, the cavity 73 is enclosed by a cover 74, which may be a potting compound in another form of the present disclosure or used with a potting compound in yet another form, thus protecting and/or sealing the cavity and the electronics therein.

Figure 4A:
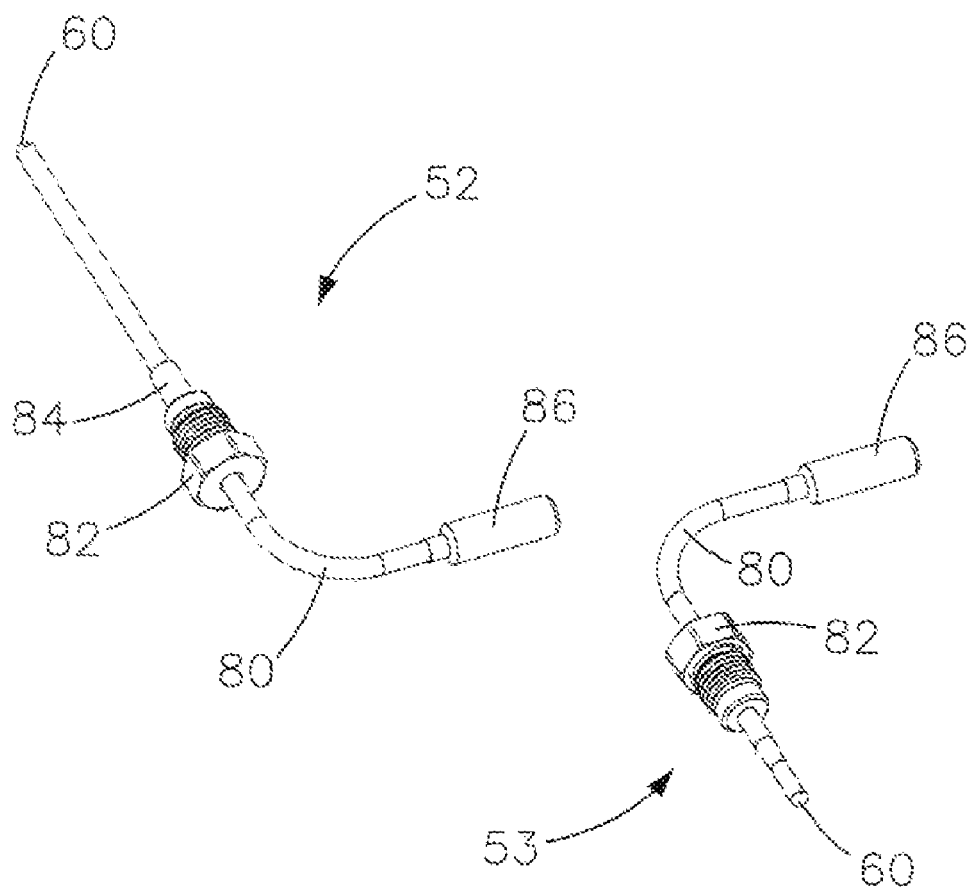
FIG. 4A is a perspective view of temperature sensor probes constructed in accordance with the principles of the present disclosure.
Figure 4B:
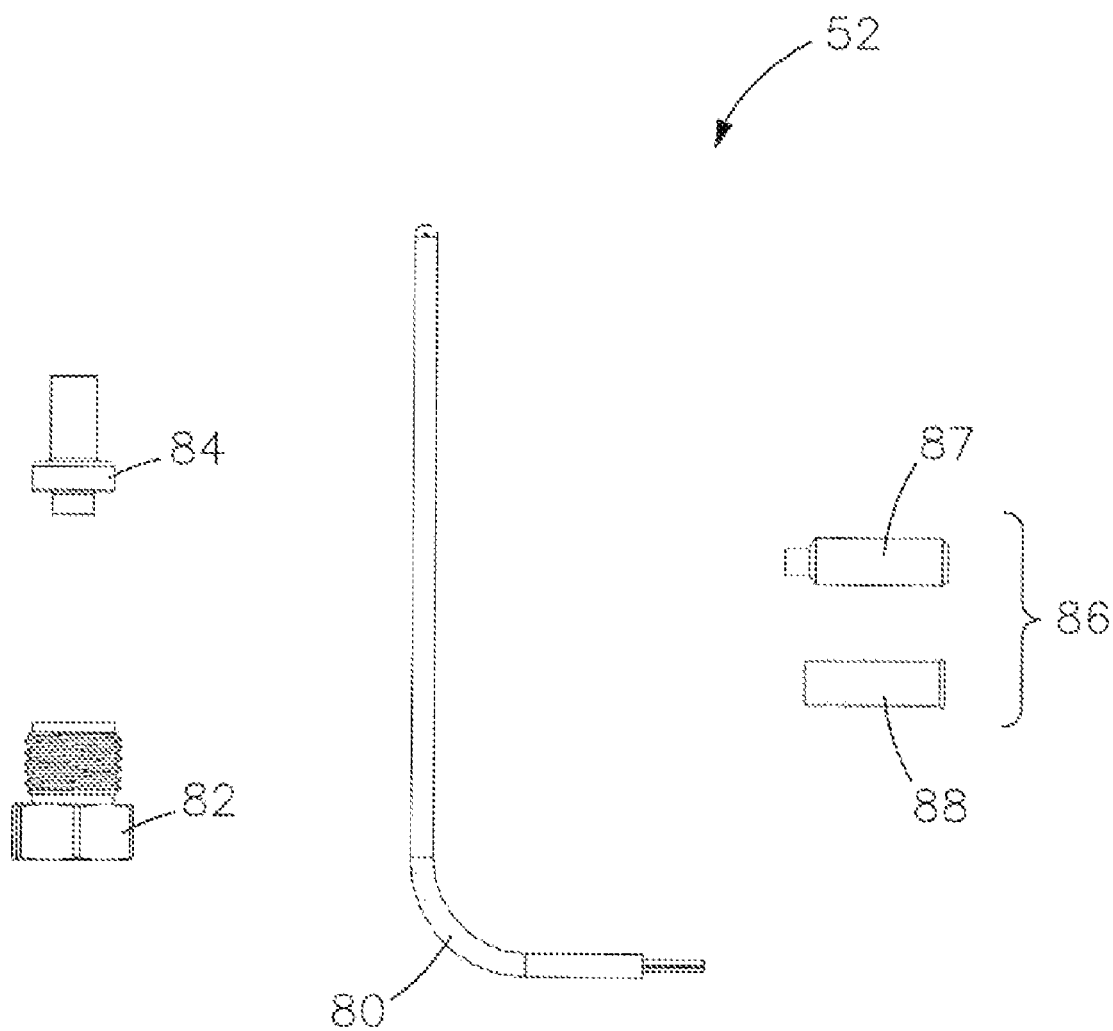
FIG. 4B is a side exploded view of one of the temperature sensor probes of FIG. 4A constructed in accordance with the principles of the present disclosure.
Figure 4C:
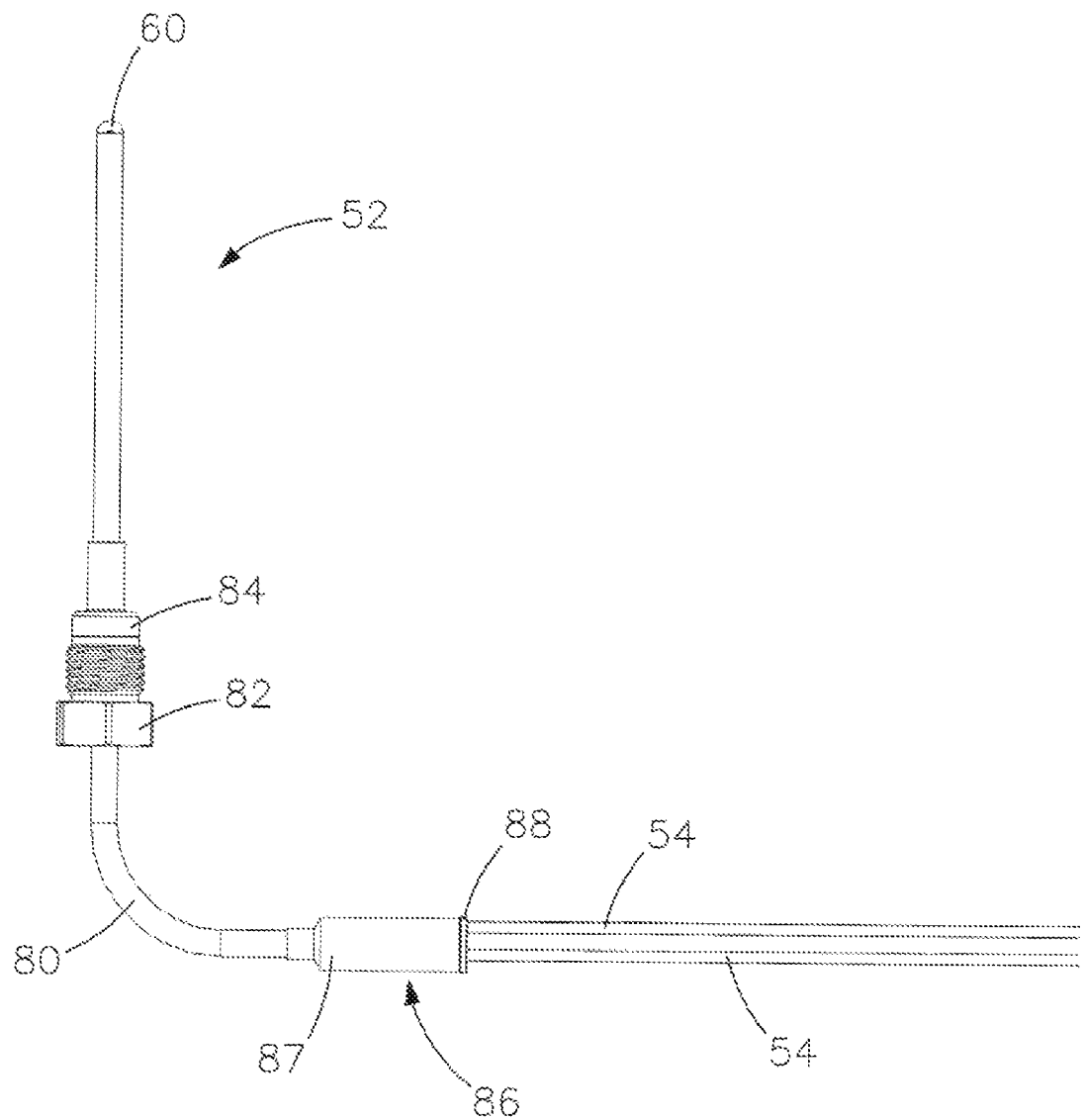
FIG. 4C is a side view of one of the temperature sensor probes of FIG. 4A constructed in accordance with the principles of the present disclosure.

Referring now to FIGS. 4A to 4C, the two sensor probes 52 and 53 are illustrated, along with their various components and assembly thereof, prior to attachment to the lead wires 54. The sensor probes 52, 53 are preferably constructed with cables 80 or constructed sensor tubes having intermediate bends of about 90 degrees from the tip cap 60 to the transition component 86. The components of the sensor probes 52, 53 include the cable 80, preferably MI and having about a 90 degree bend, a mounting connector 82, a collar 84, and a transition component 86, the transition component 86 comprising a transition body 87 and a grommet 88. The lead wires 54 are coupled through the transition component 86 for connection to the housing (not shown), which is described in greater detail below.

Figure 5:
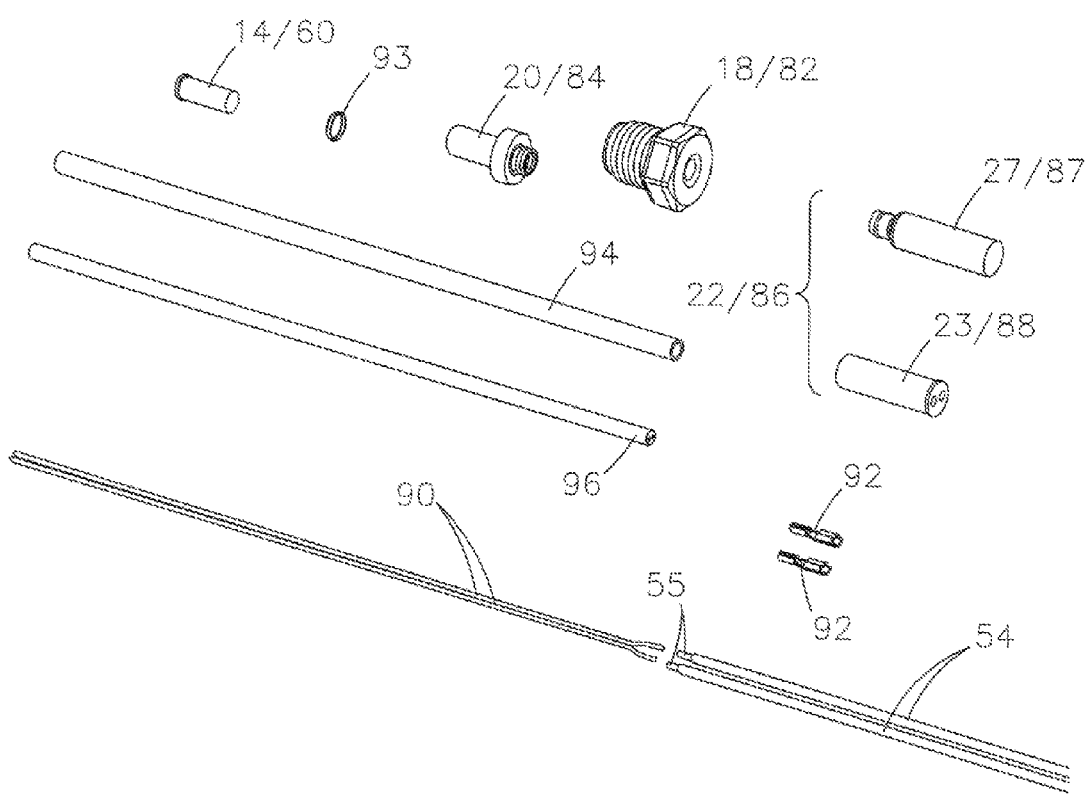
FIG. 5 is an exploded perspective view of various components, also referred to as a "kit," for assembly of a temperature probe in accordance with the principles of the present disclosure.

Turning now to FIG. 5, various components of the temperature sensor assembly 50 are illustrated and described with reference to the sequential assembly thereof. The sensor probes 52, 53 as shown in FIGS. 4A to 4C, by way of example, can be assembled from a selection of components as shown in one exemplary embodiment of an unassembled "kit" in FIG. 5. The "kit" of FIG. 5 includes conductors 90, connectors 92, lead wires 54 having leads 55, an insulator 96, a tube 94, a transition component 22/86 comprising a transition body 27/87 and a grommet 23/88, a mounting connector 18, a collar 20/84, a tip cap 14/60, and a tip disc 93. The assembly of these components, which may comprise a "kit", will be described below.

Figure 6:
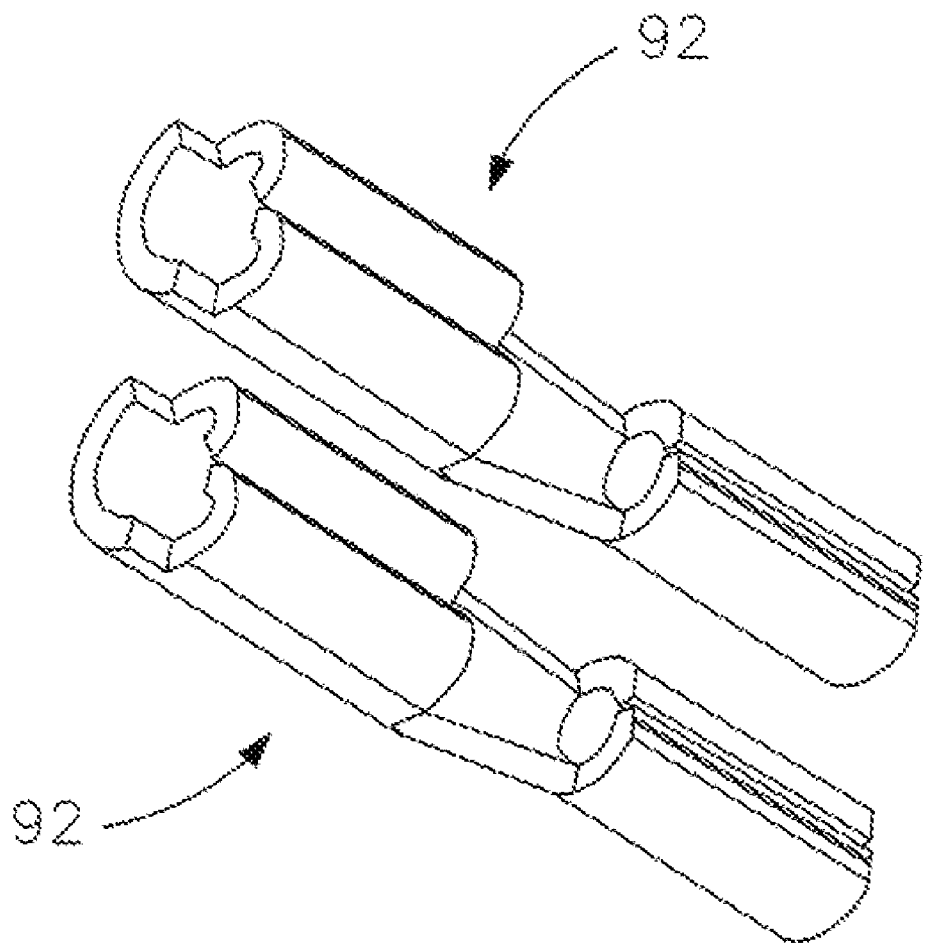
FIG. 6 is an enlarged perspective view of an electrical connector for a temperature probe transition component constructed in accordance with the principles of the present disclosure.

FIG. 6 illustrates one embodiment of connectors 92 that provide for the crimping termination of the temperature probe conductors 90 and the crimping of the sensor leads 55 to a second opposing end of each connector 92. As shown in FIG. 6, the connectors 92 may have a straight configuration to provide for an in-line crimp between the leads 55 and the conductors 90. The connectors 92, when assembled, each reside within their own channel within the grommet 88 enclosed within the transition component 86. In some embodiments, the connector 92 is composed of a metal that can be welded, so that a conductor 90 and/or a wire 54 can be welded to the connector 92 following compressive engagement with the connector 92 such as through crimping.

Figure 7A:
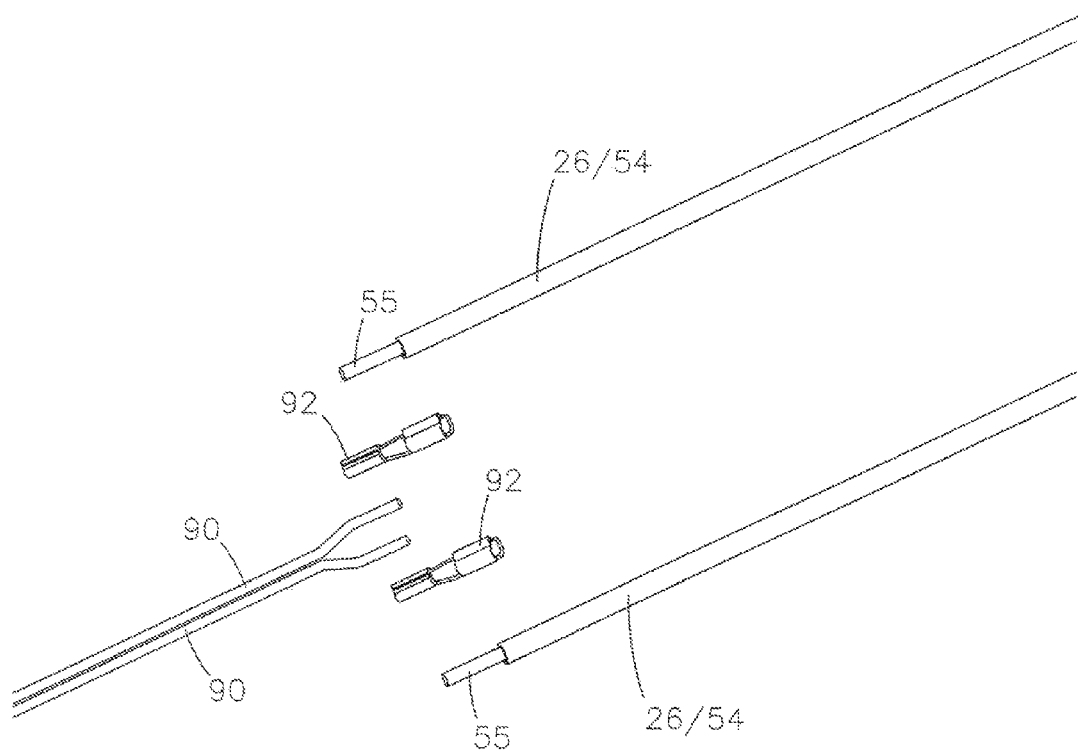
Figure 7B:
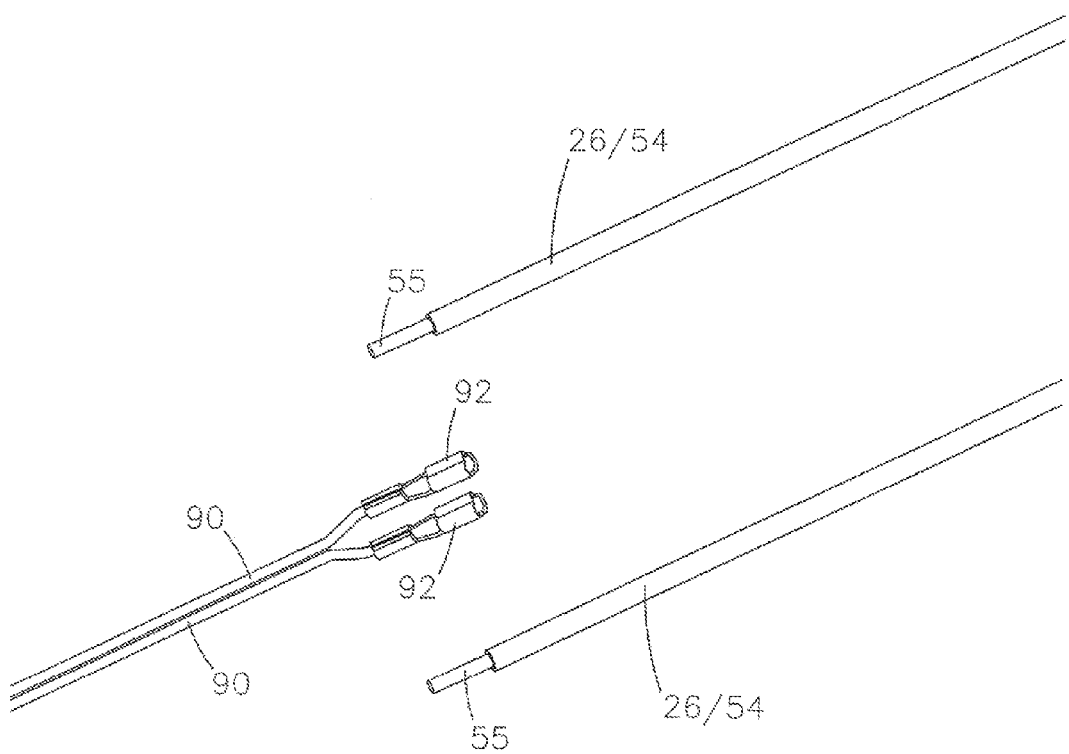
Figure 7C:
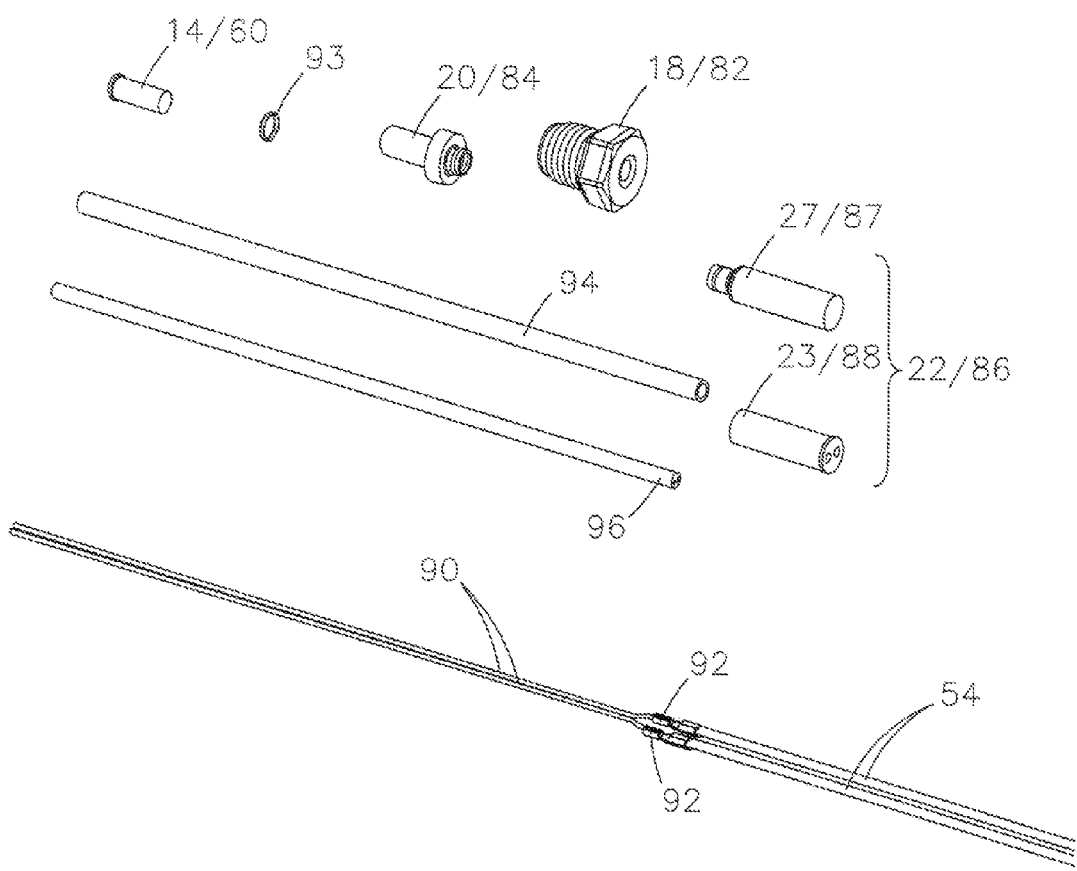
Figure 7D:
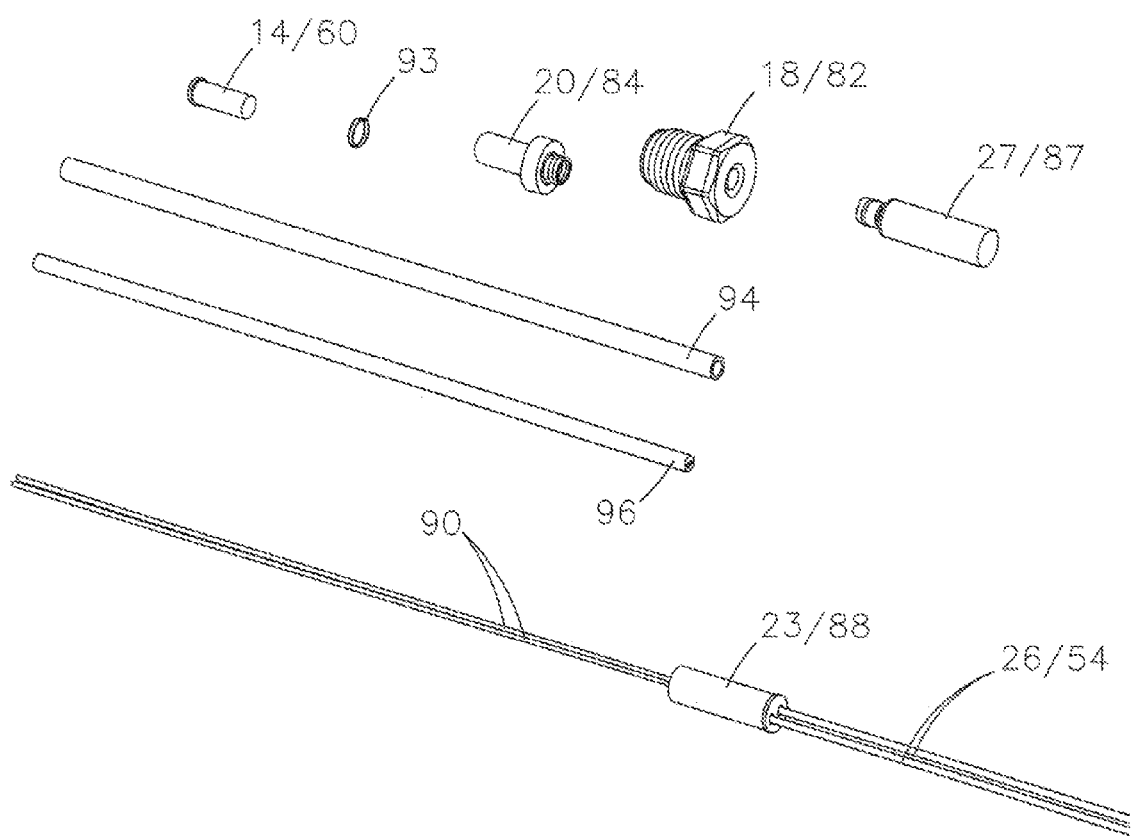
Figure 7E:
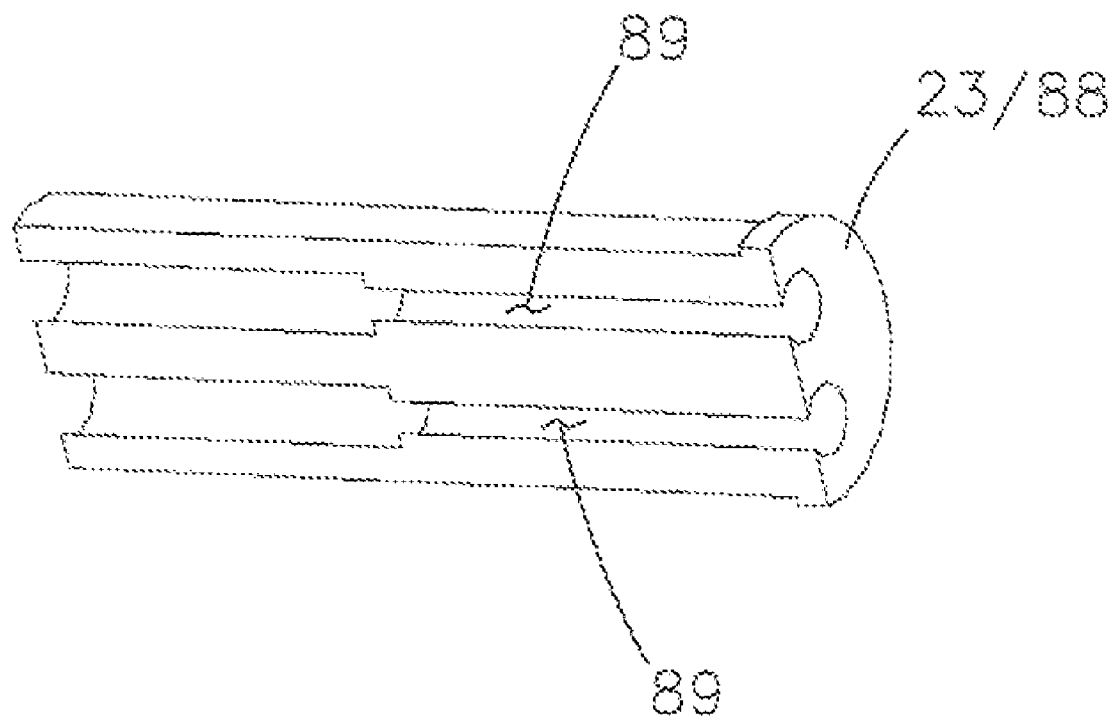
Figure 7F:
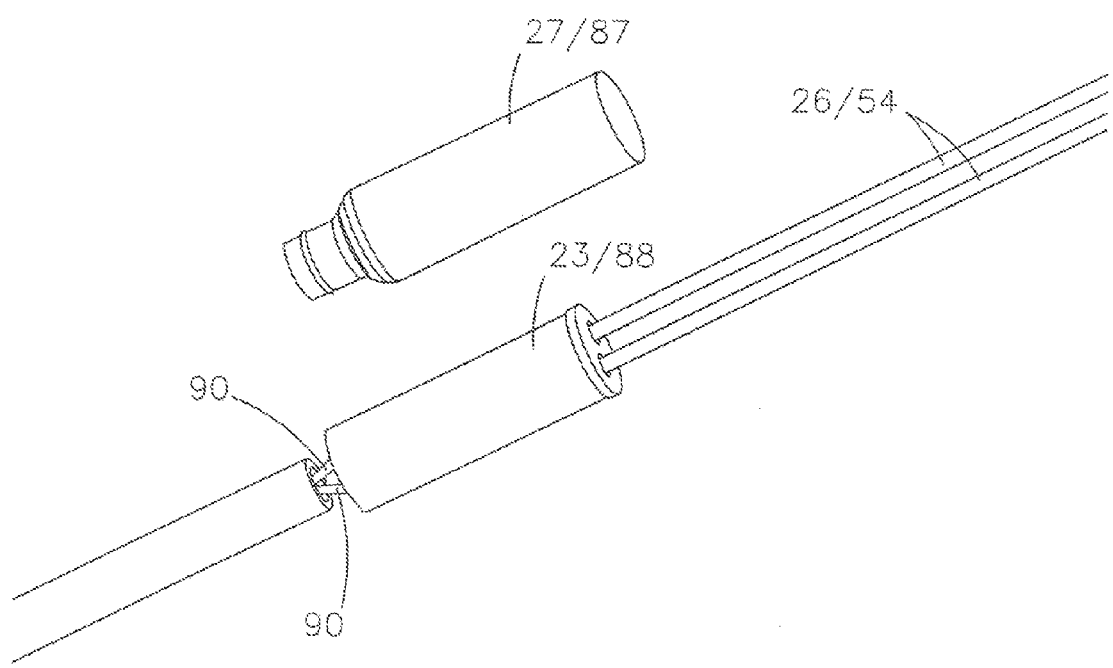
Figure 7G:
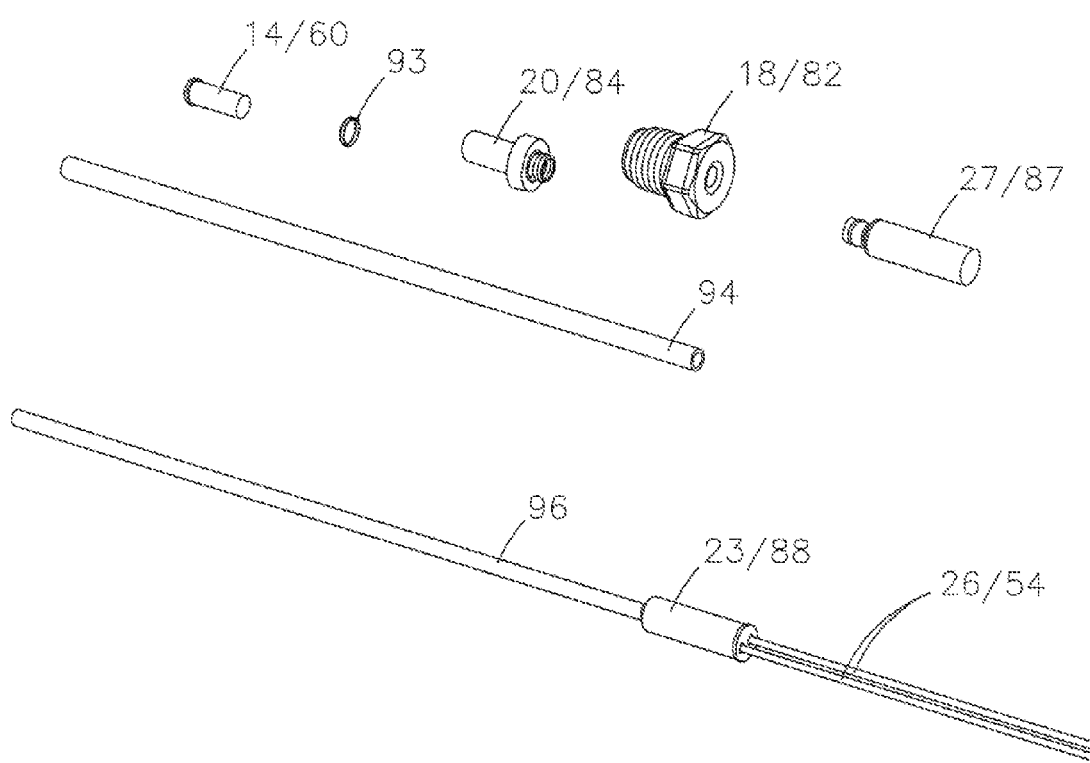
Figure 7H:
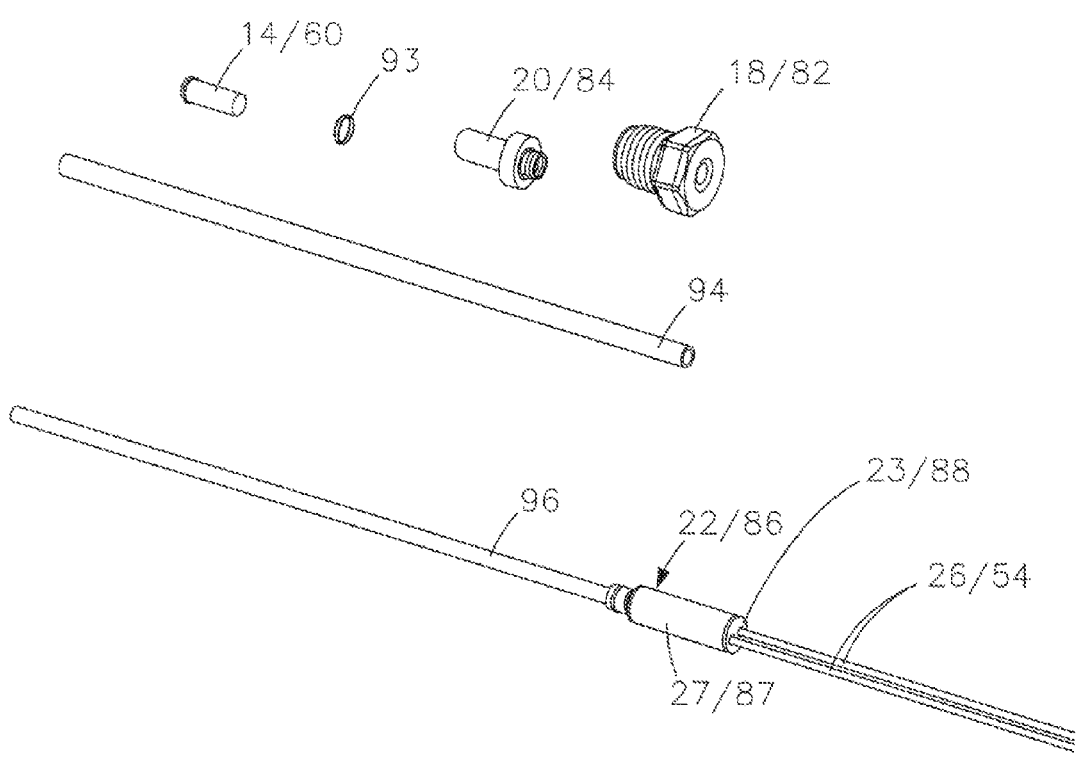
Figure 71:
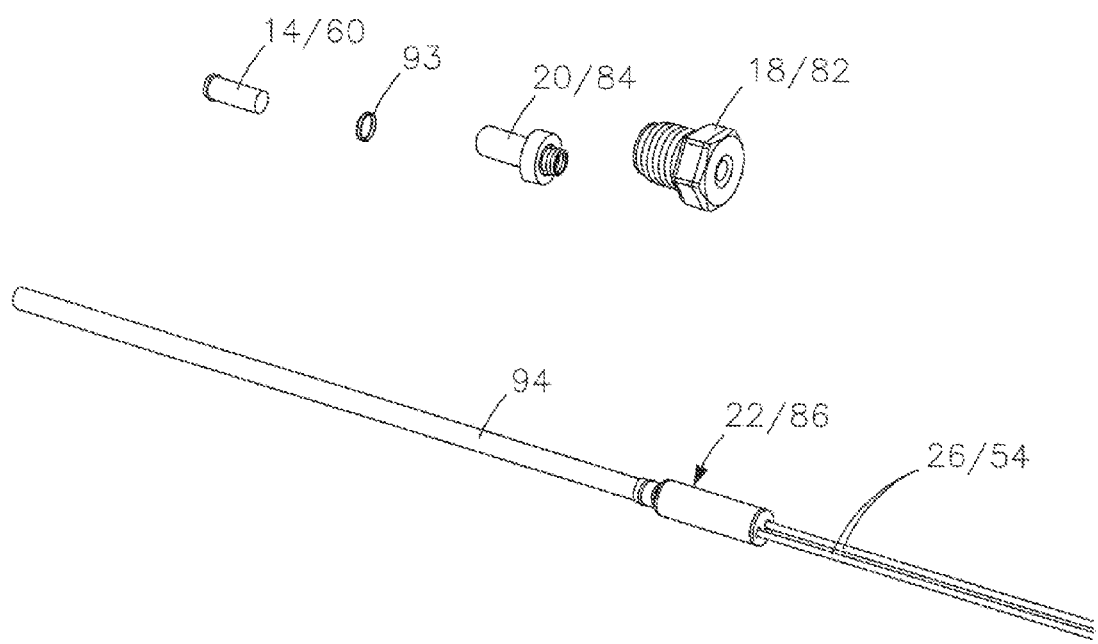
Figure 7J:
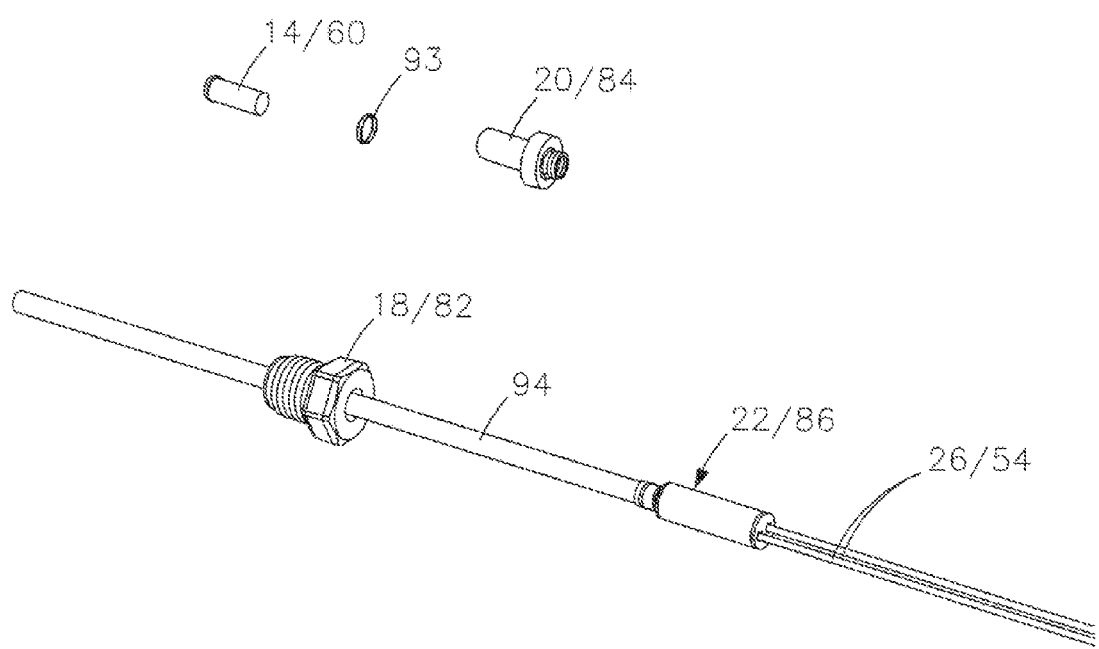
Figure 7K:
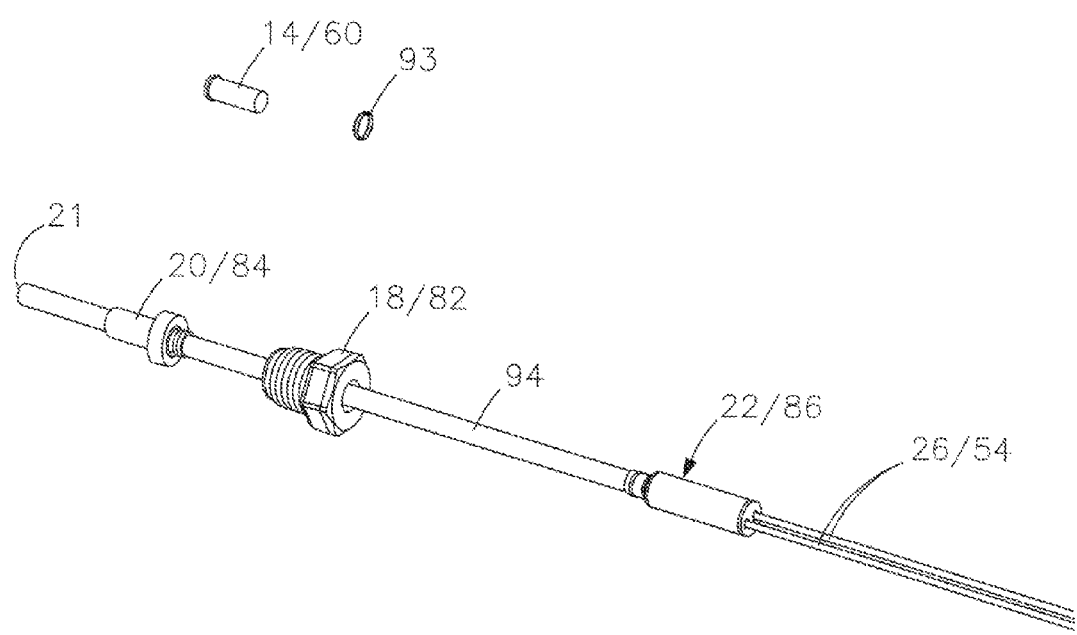
Figure 7L:
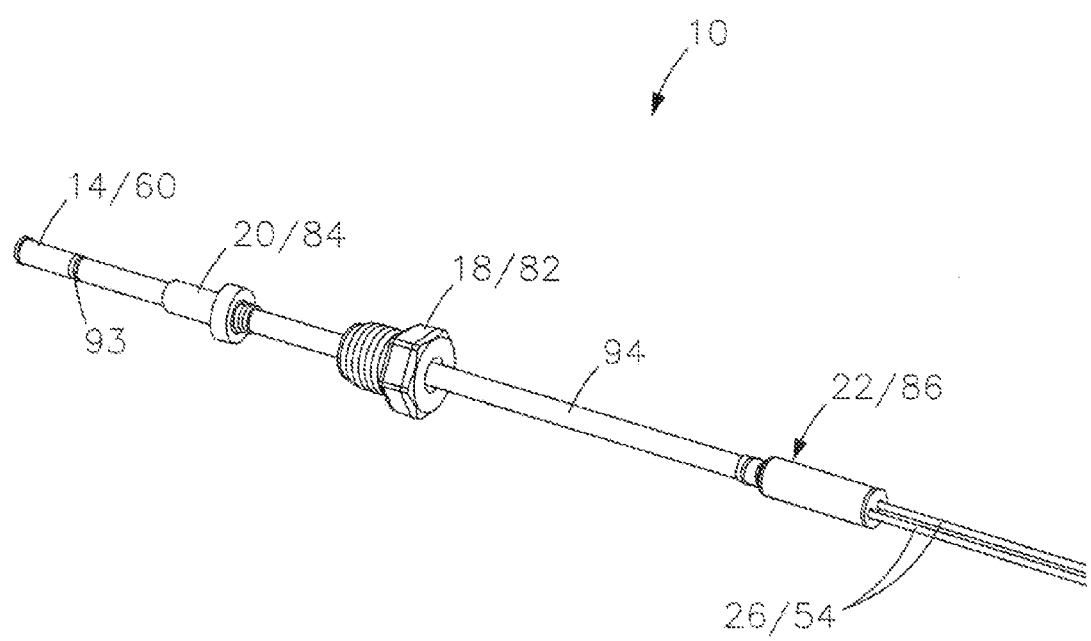
Figure 8:
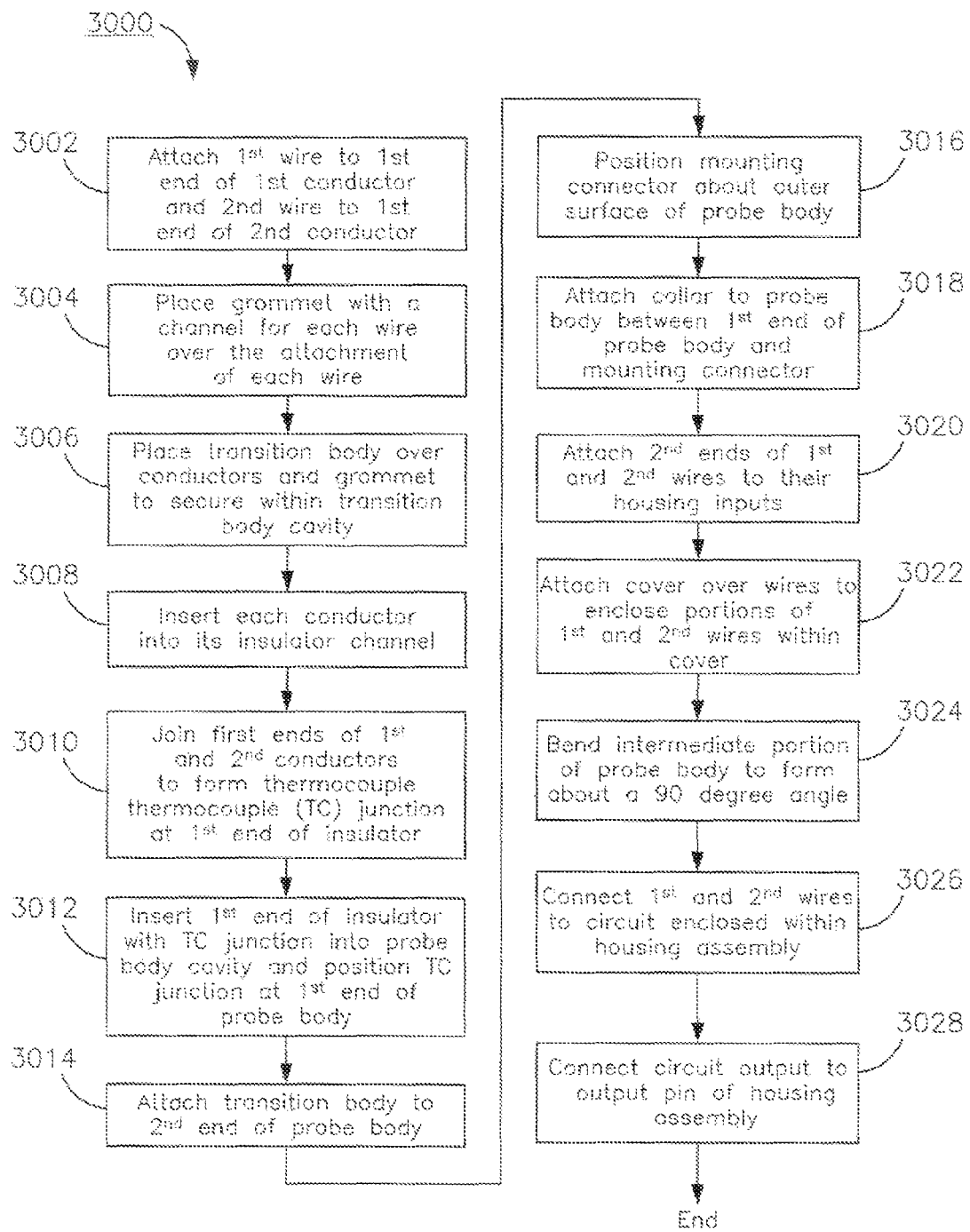
FIG. 8 is a flow chart illustrating a method of assembling a temperature sensor in accordance with the principles of the present disclosure.

Referring now to FIGS. 7A to 7L and to the flow chart of FIG. 8, various exemplary embodiments of temperature sensor assembly parts of a kit such as the kit of FIG. 5, and methods of manufacturing and assembling temperature sensor assemblies are illustrated.

FIG. 7A illustrates the unassembled relationship of the formed sensor conductors 90 to the connectors 92 and the connectors 92 to the lead wires 26/54. FIG. 7B illustrates the relationship of the sensor conductors 90 after being crimped to the connectors 92 showing how the forming step maintains a physical separation between each of the connectors 92. FIG. 7C illustrates the assembly of the sensor conductors 90, the connectors 92, and the lead wires 26/54 after the lead wires 26/54 are crimped to a second end of each connector 92. The other components for the temperature sensor assembly 10, 50 are also illustrated in their unassembled state as another embodiment of sensor kit components. These components include an insulator 96, a tube 94, a transition component 22/86 comprising a transition body 27/87 and a grommet 23/88, a mounting connector 18, a collar 20/84, a tip cap 14/60, and a tip disc 93. In the paragraphs that follow, a description is given as to how each of these components may be added to the assembly.

FIG. 7D illustrates the assembly after attaching the conductors 90 to the wires 54, via the connectors 92, and placing the attached portions within individual channels of the grommet 23/88, further maintaining a physical separation of the connectors 92 from each other. In other embodiments, the conductors 90 can be welded or otherwise directly attached to the wires 26/54 and those attachments can be enclosed within the channels of the grommet 23/88. As one exemplary embodiment. FIG. 7E provides cross-sectional details of the grommet 23/88 illustrating the individual channels 89 within the grommet 23/88 for maintaining the physical separation of the connectors 92. As shown, the channels 89 can have a step nature having two portions each coupled in series and each having a different diameter or channel width.

FIG. 7F further illustrates an embodiment of a temperature sensor having two sensor conductors 92 attached to connectors (not shown) and wires 26/54 attached to the connectors 92, with the attachments placed within the stepped channels 89 of the grommet 23/88. The conductors 90 of FIG. 7F are each formed so as to extend in an outward direction from a longitudinal axis, which may help facilitate crimping of the conductors 90 to the connectors 92.

FIG. 7G illustrates the assembly of an insulator 96 over sensor conductors 90. The probe may comprise a tube 94 or sheath that can be assembled on the insulator 96 in an embodiment where a curved MI cable 80 is not used for the probe body. FIG. 7H illustrates the transition body 27/87 being assembled over the grommet 23/88 and an end of the insulator 96.

FIG. 7I illustrates the assembly of FIGS. 7G and 7H having the tube 94 positioned over the insulator 96. The transition body 27/87 may be attached to the metal body of the tube 94, such as by welding.

FIG. 7J illustrates the mounting connector 18/82 being rotatably positioned about the body of the probe, which is the tube 94 in this example and FIG. 7K shows the collar 20/84 being positioned between the sensing end 21 of the probe and the mounting connector 18/82. The collar 20/84 is attached to the probe body (tube 94), such as by welding or other means. The collar 20/84 is preferably attached to the surface of the probe body or tube 94 to form an airtight seal in some embodiments. The mounting connector 18/82 and collar 20/84 are each adapted for mounting the temperature probe 12/52 to a mounting surface, such as by screwing the mounting connector 18/82 into a threaded hole and sealing the collar 20/84 and mounting connector 18/82 against the mounting surface, by way of example.

FIG. 7L shows the placement of a tip cap 14/60 and/or a tip disc 93 that can be attached, such as through welding, to the end of the metal probe tube 94 or MI cable to enclose the temperature sensor. In some embodiments, the end of the MI tube 94 or the probe body can be left open and not sealed.

This process is also described in FIG. 8 as one exemplary embodiment of a manufacturing assembly operation. The process 3000 includes a step 3002 of attaching a first wire to a first end of a first conductor and attaching a second wire to a first end of a second conductor, another step 3004 of placing a grommet having a first channel over the attachment of the first wire to the first conductor and having a second channel over the attachment of the second wire to the second conductor, another step 3006 of placing a transition body over the first and second conductors and about the grommet for securing the grommet and attachments within a cavity of the transition body, another step 3008 of inserting each conductor into a channel of an insulator, another step 3010 of joining the first end of the first conductor to the first end of the second conductor to form a thermocouple junction at a first end of the insulator, another step 3014 of attaching the transition body to a second end of a probe body, another step 3016 of positioning a mounting connector about the outer surface of the probe body between a first end and the second end of the probe body, and another step 3018 of attaching a collar to the outer surface of the probe body between the first end of the probe body and the mounting connector. The process 3000 can also include a step 3020 of attaching a second end of the first wire to an input of a housing and attaching a second end of the second wire to an input of the housing. This step 3020 may also include attaching a second end of the first wire to a circuit board; and attaching a second end of the second wire to the circuit board.

In other embodiments, the process 3000 can include a step 3022 of attaching a cover over the wire, or a portion of the wires. For example, the cover could extend from the transition body or probe to an input of the housing, enclosing a portion of the first and second wires within the cover between the transition body and the housing. In yet other embodiments, the process 3000 can include a step 3024 of bending an intermediate portion of the probe body between the transition body and the mounting connector to form an angle, such as a 90 degree angle.

The process 3000 can also include a step 3026 of connecting the first wire and the second wire to a circuit enclosed within a housing assembly having an input for receiving a second end of the wires, the circuit being configured for receiving a temperature signal from the temperature sensor, for example a thermocouple, and generating the temperature characteristic in response to the received temperature signal. Further, the process 3000 may include a step 3028 of connecting an output of the circuit to an output pin of the housing assembly configured for providing the generated temperature characteristic to a temperature measurement system coupled to the output pin.

Figure 9:
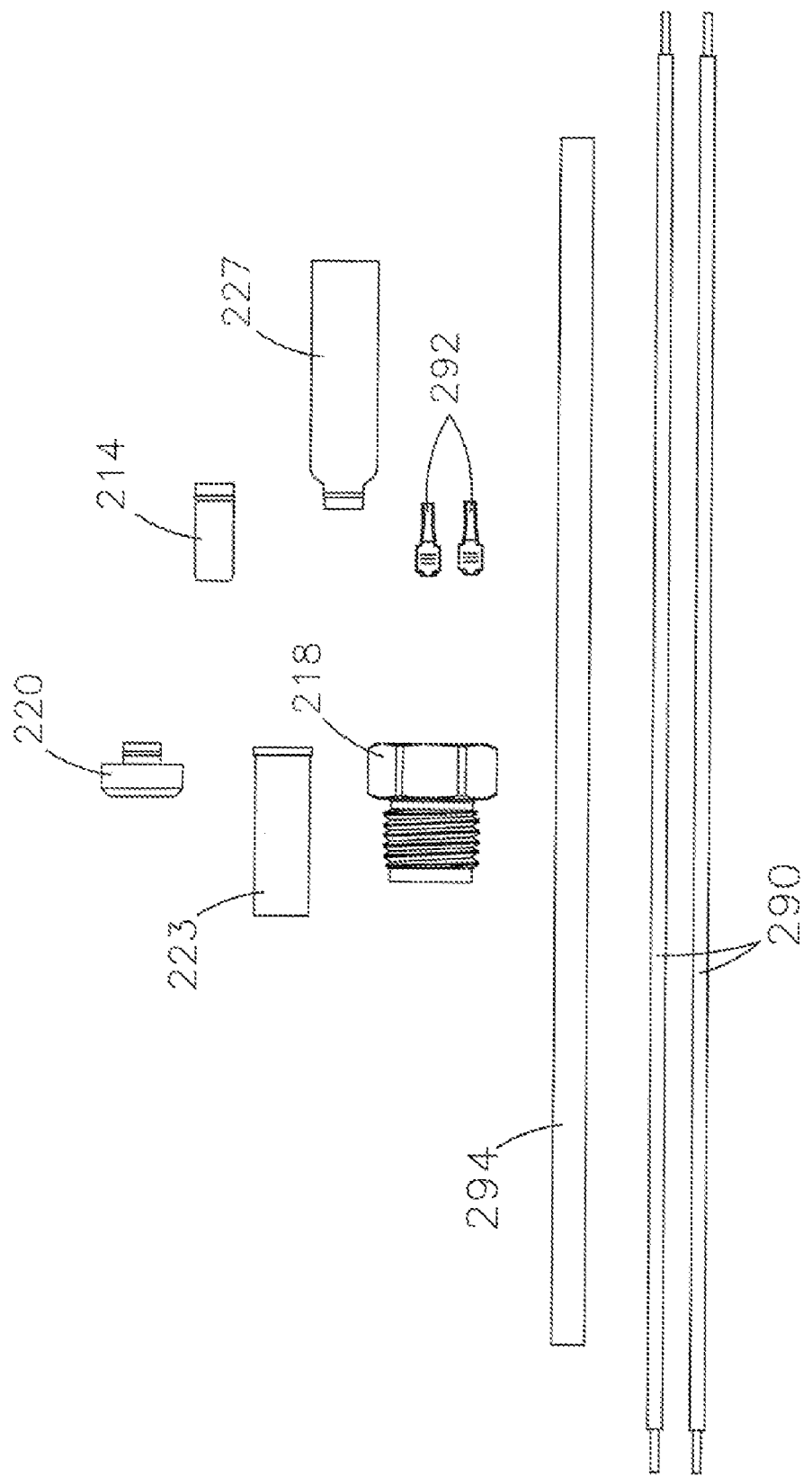
FIG. 9 is an exploded side view of various components, also referred to as a "kit," for assembly of a temperature probe according to another form of the present disclosure.
Figure 10A:
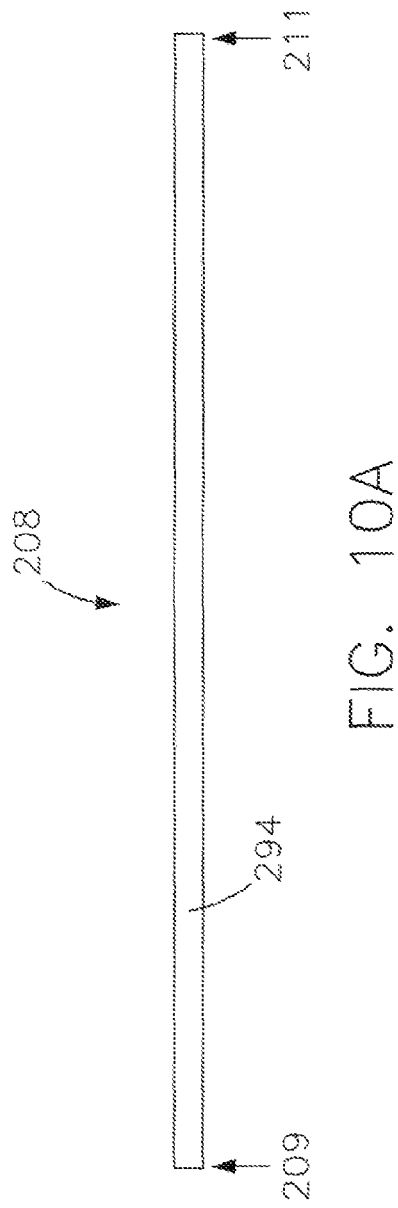
FIGS. 10A-10N are sequential assembly side views of the various components and a method of assembling the temperature probe of FIG. 9 in accordance with the principles of the present disclosure.
Figure 10B:
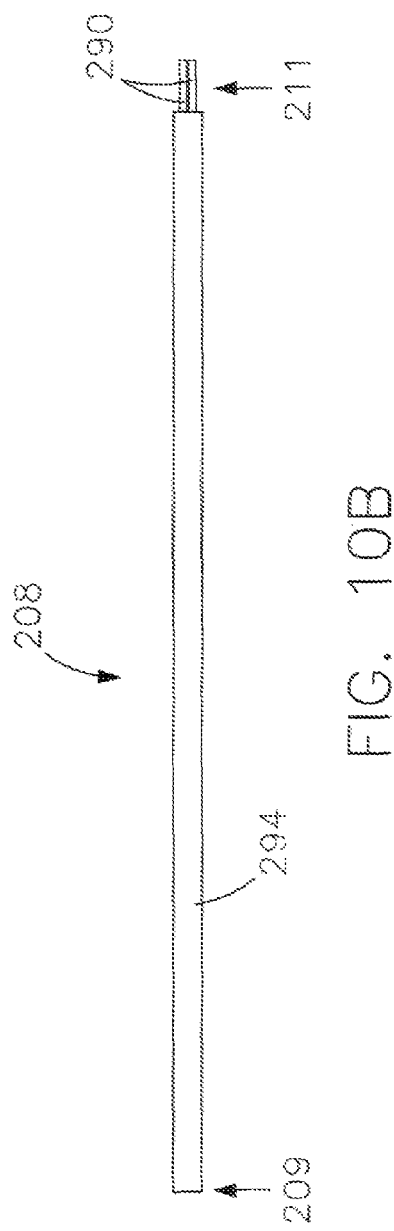
Figure 10C:
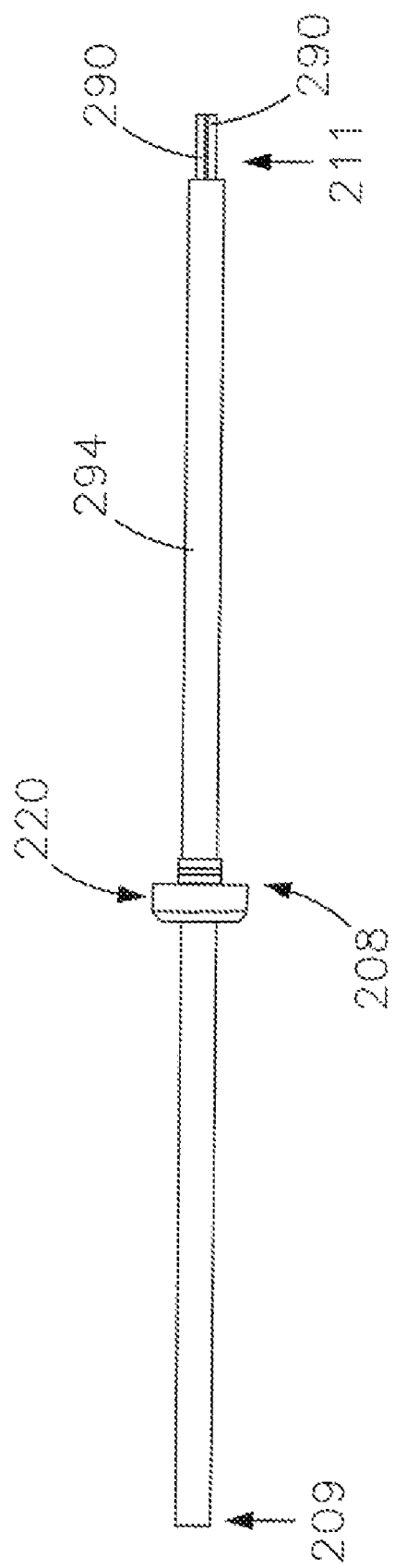
Figure 10G:
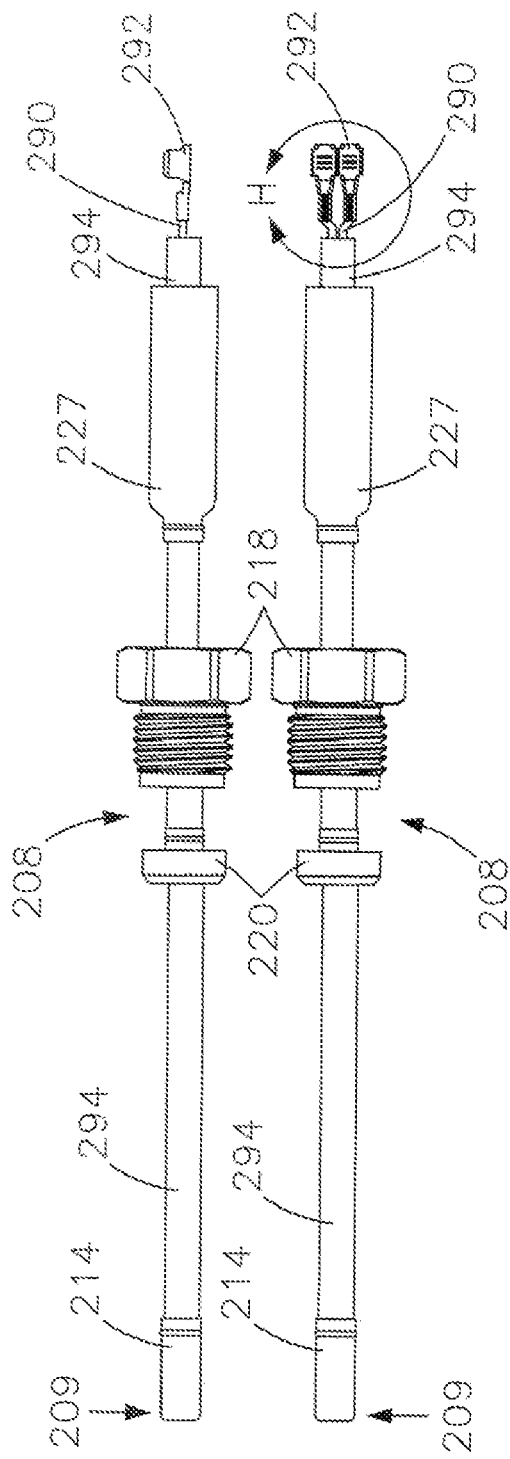
Figure 10H:
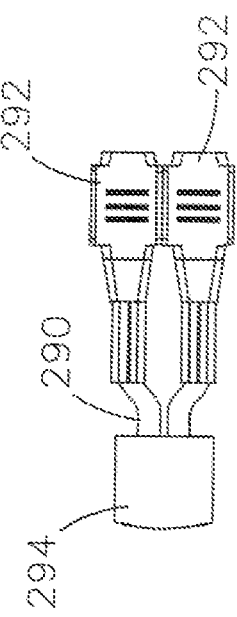
Figure 10M:
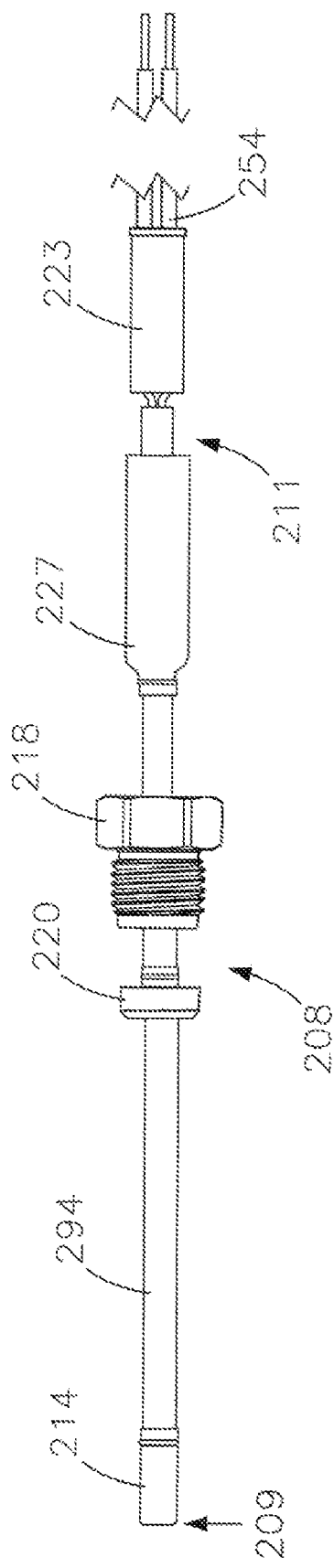
Figure 10N:
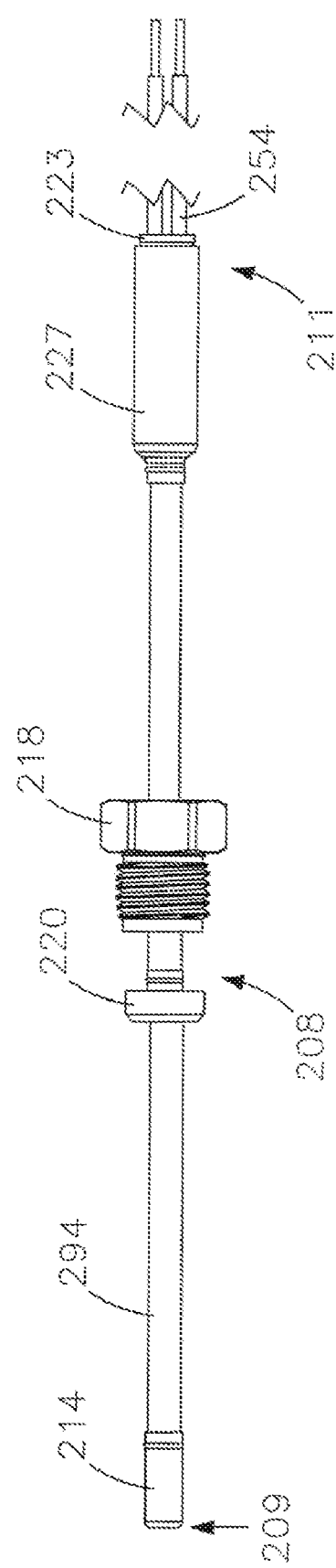

Referring now to FIG. 9, FIGS. 10A to 10N, and to the flow chart of FIG. 11, various embodiments of temperature sensor assembly parts (or a kit as shown in FIG. 9) and the methods of manufacturing and assembling temperature sensor assemblies (as shown in FIGS. 10A to 10N) are illustrated, which will now be described. The "kit" of FIG. 9 includes conductors 290, connectors 292, a MI cable 294, a transition body 227, a grommet 223, a mounting connector 218, a collar 220, and a tip cap 214. The assembly of these components, which may comprise a "kit", will be described below.

Figure 11:
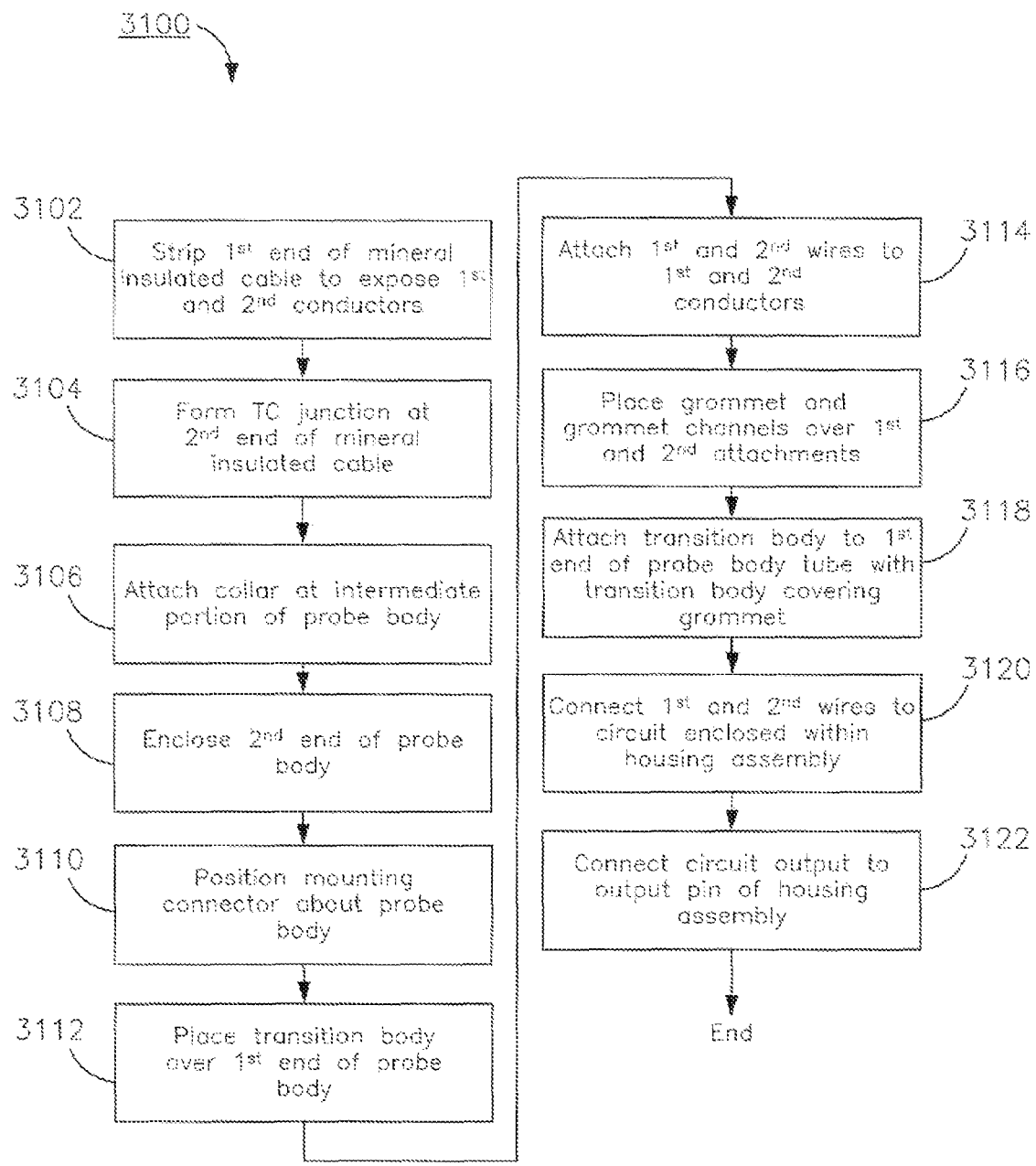
FIG. 11 is a flow chart illustrating a method of assembling another form of a temperature sensor assembly in accordance with the principles of the present disclosure.

As shown in FIG. 11, another example of a process 3100 of assembling a temperature sensor assembly is illustrated. The process 3100 starts with a MI cable 294 as shown in FIG. 10A, which has an end stripped to expose a first conductor 290 and a second conductor 290 as shown in FIG. 10B. Thus, the process 3100 includes a step 3102 of stripping a first end of a MI cable 294 to expose first and second conductors 290 The process 3100 also includes a step 3104 of forming a thermocouple junction or other temperature sensor or sensing element at a second end 209 of the mineral insulated cable 294. In FIG. 10C, a collar 220 is attached about an intermediate portion 208 of the probe body (MI cable 294 in this example). Thus, the process 3100 also includes a step 3106 of attaching the collar 220 about the probe body (MI cable 294). An end of the probe body can also be closed as discussed above and shown by way of example as an attached tip cap 214 or disc (as shown in FIG. 10D) or by other means as described above. Thus, the process 3100 may include a step 3108 of enclosing the second end 209 of the probe body. The process 3100 also includes a step 3110 of positioning a mounting connector 218 about an outer surface of the probe body (MI cable 294) between the first end 211 of the probe body and the collar 220 as shown in FIG. 10D, and a step 3112 of placing a transition body 227 over the first end 211 of the probe body. The conductors 290 can be formed for crimping or attaching as shown in FIGS. 10E-10F, wherein the conductors 290 are bent so as to oriented in an outward direction from the longitudinal axis of the MI cable 294.

The processes 3100 further includes a step 3114 of attaching the conductors 290 to exposed wire leads 255 of wires 254. The conductors 290 could be connected directly to the leads 255 of the wires 254, or they may be attached by crimping, welding, soldering, other mechanical coupling, or any other suitable coupling as is know to those skilled in the art. This step 3114 can include forming an end of each conductor 290 for crimping, and as described above, this can include stripping the end of the conductor 290 to expose a conducting portion, bending or shaping the conducting portion to a desired position or shape, and otherwise preparing the conducting portion for compression and/or welding, soldering, or coupling as is known to those skilled in the art. In some embodiments, connectors 292 can be welded, soldered or otherwise coupled to the end of one of the conductors 290. With reference to FIGS. 10G-10H, the conductors 290 are mechanically crimped to the connectors 292. With reference to FIGS. 10I-10J, the lead ends 255 of the lead wires 254 are also mechanically crimped to the connectors 292. While crimping the mechanical coupling may be sufficient in some embodiments, in other embodiments the crimped coupling between the conductor 290, the wire 254, and the connector 292 can also be welded or soldered. For example, with reference to FIGS. 10K-10L, welding or soldering material may be added to the connector 292 at a portion 295, or to any other suitable portion of the connector 292. The welding described herein can include any type or method of welding known or developed in the art. In these embodiments, the combination of mechanical coupling via a crimped connector 292 and a welding of the connector 292 to the conductor 290 and/or to the wire 254 can provide benefits. For example, the combination can provide for improved conductivity, a stronger bond, and decrease failures of this attachment and coupling.

The process 3100 also includes a step 3116 of placing a grommet 223 having one or more channels (not shown) over the attachments of the wires 254 to the conductors 290, as shown in FIG. 10M. The process 3100 further includes a step 3118 of sliding the transition body 227 over the grommet 223 and attaching the transition body 227, for example by welding, to an end of the probe body with the transition body 227 substantially covering the grommet 223 as shown in FIG. 10N. As described in regard to FIGS. 3A and 3B above, the process 3100 can also include a step 3120 of attaching a second end of the first wire to a circuit board and step 3122 of attaching a second end of the second wire to the circuit board.

Additionally, as described in the example above with regard to FIG. 3, in some embodiments the method of manufacturing can also include connecting the first wire 54 and the second wire 54 to a circuit enclosed within a housing 28 of an adaptor circuit assembly 62 having an input for receiving a second end of the wires 54. As noted above the circuit can be configured with electronic components 68 and circuits, memory, a processor, and computer executable instructions configured for receiving one or more temperature signals from temperature sensors, such as a thermocouple, thermistor, or RTD, and generating one or more temperature characteristics in response to the received temperature signals. The method can also include connecting an output 53 of the circuit to an output connector or pin of the adaptor circuit assembly 62 configured for providing the generated temperature characteristic to a temperature measurement system coupled to the output connector.

As known to those skilled in the art, each of the processes described herein can be repeated to produce one or more probes. After such probes are manufactured, one or more, for example, two probes can be connected to a common circuit for receiving a plurality of temperature signals. In such embodiments, the sensor adaptor circuit can be configured for generating and providing one or more temperature characteristics at the output. Each temperature characteristic can be based on one or more of the temperature signals depending on the desired application and operational environment for the temperature sensor assembly.

Various benefits are provided by one or more embodiments of the temperature sensor assemblies and methods of manufacturing such temperature sensor assemblies as generally described in this disclosure. One or more of these embodiments can provide for a high compaction construction, an assembly that is high vibration and shock resistance and therefore provides a longer useful life. The temperature sensor assemblies described herein are capable of use in a wide variety of temperature applications including temperature of flames and temperatures of greater than 900 degree Celsius and have been shown to perform well up to temperatures of 1200 degree Celsius through the use of Alloy 600 in the construction. The design and method of construction provides for utilizing either a moderate duty lead wire or up to an extra heavy duty lead wire which is the source of many faults and failures for temperature sensor assemblies. Similarly, the assemblies of the present disclosure can be utilized in a wide variety of temperature sensing applications including low temperature applications such as coolant, brake fluid, inlet air, sea water, and oil temperature.

In some embodiments more than one temperature probe 12 can be included in the temperature sensor assembly 10 or more than one temperature sensor can be included in one or more temperature probes 12. In such cases, one or more of the temperature probes 12 or sensors can provide separate temperature signals to the circuit associated with one or more measured or sensed temperatures. In one such embodiment, the assembly includes a second wire set corresponding to a set of second conductors 90, and a second transition component 22 for coupling each of the second conductors 90 to at least one of the wires 26 of the second wire set. In these cases, the housing 28 will include a second input 36 for receiving the second wire set 26. The circuit is adapted to receive the second temperature signals and generate a second temperature characteristic indicative of the temperature about the exterior of the second temperature probe 12.

In one embodiment, the temperature probe 12 is assembled from a mineral insulated cable having conductors, a metal body, and insulating material. In other embodiments, the temperature probe 12 can be manufactured to include the conductors 90 and the body 16. In some embodiments, a collar 20 is positioned about an exterior surface of the probe body 16 and adapted for engaging the fitting to secure the temperature probe 12 to the mounting assembly 18. The collar 20 is attached, such as by welding, to the exterior surface of the probe body 16. The collar 20 can be attached to the exterior surface of the probe body 16 by any known or future method including laser welding, spin welding, electronic beam welding, resistance welding, and ultrasonic welding, by way of example.

In some embodiments, the transition component 22 includes a grommet 23 and a transition body 27. The grommet 23 can include one or more internal cavities 89 each dimensioned for receiving an end of one of the conductors 90 and for receiving an end 34 of at least one of the at least one wire 26 of the wire set, and the transition body 27 having a cavity substantially enclosing the grommet 23 and being welded to the probe body 16. Each of the internal cavities 89 of the grommet 23 can also be configured to include a first portion and a second portion coupled and positioned in series with the first portion. The second portion can have a cavity width greater than or less than a cavity width of the first portion.

In some embodiments, the conductors 90/290 are directly connected to the wires 26/54/254 by welding or soldering or other known forms of directly connecting conductors 90/290. In other embodiments, an electrical connector 92/292 is utilized to couple the conductors 90/290 to the wires 26/54/254. For example, one electrical connector 92/292 can include a first end compressively engaging a conductor 90/290 and/or a second end compressively engaging a wire 26/54/254. This can be a crimp compression engagement or similar coupling. In such cases, the electrical connector 92/292 can be positioned within one of the internal cavities 89 of the grommet 23/223, when provided. In some embodiment, the compressive engagement can be supplemented with a welding or soldering. In such cases, the electrical connector 92/292 is preferably composed of a weldable material, such as an alloy 42 material, by way of example. In other embodiments, the transition component 22/86/222 may couple the conductors 90/290 to the wires 26/54/2554 by maintaining a mechanical communication between the wire leads 55/255 and the conductors 90/290.

In some embodiments, the probe body 16 is formed from a metal tube 94/294. This can aid in the manufacturing process and help reduce costs. In such embodiments, one end 209 of the metal tube 94/294 can be closed about the temperature sensor by crimping, welding, roll forming and/or swaging an end 209 of the metal tube 94/294. In other embodiments, a tip cap 14/60/214 or disc 93 can be positioned proximate the end 209 of the metal tube 94/294 including the temperature sensor, and can be welded, brazed, or otherwise bonded to the end 209 of the metal tube 94/294 to close the end 209 of the metal tube 94/294 and to seal it for temperature sensing applications.

As noted above, the probe body 16/80 can be formed, bent or otherwise arranged for mounting on the desired temperature sensing application. For example, the probe body 16/80 can be bent or formed to have any required angle, and as shown in the examples of some of the figures, has an intermediate portion having an angled portion positioning the first end of the probe body 80 at about 90 degrees from the second end of the probe body 80.

In some embodiments, a cover 58 covering all or a portion of the wire set 54 from the transition portion 22 or probe body 16 to the housing input 36 can be provided to provide an aesthetic or practical benefit to the temperature sensor assembly. For example, in some cases the temperature sensor assembly 10, 50 may be placed in a high heat environment where it may be desirable for the cover 58 to be adapted with heat shielding or deflecting material. In other embodiments, it may be desired to protect the leads 55 due to moving parts or a likelihood that the leads 55 may be snagged or pulled in the operating environment.

Each of the sensor probes 12/52/53/212 can include a wire set having one or more wires 26/54/254 and a transition component 22/86/222 coupled to an end of the probe body 16/80/94/294. A grommet 23/88/223 having one or more channels 89 adapted for receiving one or more of the conductors 90/290 and one or more of the wires 26/54/254 provides, at least in part, a transition between the probe assembly and the wire set. The grommet 23/88/223 can also be configured to enclose the coupling of each wire 26/54/254 to each conductor 90/290.

In some embodiments, each sensor probe 12/52/212 can include a collar 20/84/220 attached to the exterior of the probe body 16/80/94/294 and a connector 18/82/218 rotatably coupled to the probe body 16/80/94/294 that is configured to engage the collar 20/84/220 and to secure the temperature probe 12/52/212 to a first mounting assembly within the operating environment.

In some embodiments, the leads from the sensor probes 12/52/212 are directly connected to the adaptor circuit assembly 62 such that the assembly is an integrated unit, e.g., the probes 12/52/212 are not unpluggable. In such embodiments, the first lead is fixedly coupled to the circuit and the second lead is fixedly coupled to the circuit. Such fixedly coupling preferably includes a coupling mechanism that does not enable the unplugging or otherwise detachment of the wire 26/54/254 from the adaptor circuit assembly 62 or adaptor circuit housing 28.

The adaptor circuit assembly 62 includes a housing 28 that can be assembled from two or more portions, can be integrated portions, or can be an integrated or unitary body. In some cases, the wire leads 26/54/254 can be retained by the housing 28 itself such as an integral portion of the molded assembly.

When describing elements or features and/or embodiments thereof, the articles "a", "an", "the" and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that each process or step can be repeated more than once and that additional or alternative processes or steps may be employed and still be within the scope of the present disclosure.

What is claimed is:

1. A temperature sensor assembly comprising:
   at least one temperature probe having a probe body and a temperature sensor and at least one conductor configured to provide a temperature signal indicative of a temperature over the at least one conductor;
   a mounting connector configured to secure the probe body to a mounting assembly;
   a wire set having at least one wire corresponding to the at least one conductor, the at least one wire having a first end and a second end, the first end of the at least one wire being coupled to the at least one conductor at a coupled portion;
   a transition component surrounding the coupled portion of the at least one conductor and the least one wire of the wire set;
   a housing having an input configured to receive the second end of the at least one wire of the wire set and an output for coupling to a temperature measurement system and providing a temperature characteristic; and
   a circuit enclosed within the housing, the circuit being configured to receive the temperature signal from the temperature probe and generate the temperature characteristic in response to the received temperature signal,
   wherein the temperature probe is external to the housing.

2. The assembly of claim 1 wherein the temperature probe includes a probe body defining a cavity therein, the temperature sensor being positioned within the cavity and the at least one conductor being positioned within the cavity.

3. The assembly of claim 1 wherein the temperature probe includes a mineral insulated cable including the at least one conductor, the probe body and an insulating material.

4. The assembly of claim 1 wherein the temperature sensor is a thermocouple and wherein the temperature signal includes a voltage level generated by the thermocouple and wherein the circuit includes a cold junction compensation circuit and wherein the temperature characteristic is a resistance value.

5. The assembly of claim 4 wherein the temperature probe includes a mineral insulated cable having the at least one conductor contained therein, wherein the at least one conductor is two conductors, the two conductors being coupled to form a thermocouple junction of the thermocouple.

6. The assembly of claim 1 wherein the circuit is configured to generate a signal including the temperature characteristic, the signal selected from the group consisting of a ratiometric analog voltage signal (RAVS), a pulse width modulated signal, a variable frequency signal, a variable output impedance, a variable voltage signal, and a variable current signal.

7. The assembly of claim 1 wherein the circuit is configured to generate a digital signal including the temperature characteristic and wherein the assembly is adapted to connect to a component in communication with one of a controller area network (CAN), an instrument, an engine control module, and a digital communication facility.

8. The assembly of claim 1 wherein the temperature probe having a probe body and a temperature sensor and at least one conductor is a first temperature probe having a first probe body, a first temperature measuring device and at least one first conductor, the assembly further comprising a second temperature probe having a second probe body and a second temperature measuring device and at least one second conductor configured to provide a second temperature signal indicative of a second temperature about an exterior of the second temperature probe.

9. The assembly of claim 8, further comprising:
   a second wire set having at least one second wire corresponding to each of the at least one second conductors, the at least one second wire being coupled to the at least one second conductor at a second coupled portion; and
   a second transition component surrounding the second coupled portion of the at least one second conductor and the at least one second wire;
   wherein the housing includes a second input the second wire set and wherein the circuit is configured to receive the second temperature signal and generate a second temperature characteristic indicative of the temperature about the exterior of the second temperature probe, and wherein the output is configured to provide the second temperature characteristic.

10. The assembly of claim 1 wherein the mounting connector includes a powdered metal fitting having threads configured to screw the fitting into a threaded mounting assembly.

11. The assembly of claim 10 wherein the probe body is a metal, the assembly further comprising a collar positioned about an exterior surface of the probe body, the collar being configured to engage the fitting to secure the temperature probe to the mounting assembly.

12. The assembly of claim 11 wherein the collar is attached to the exterior surface of the probe body by a method selected from the group consisting of laser welding, spin welding, electronic beam welding, resistance welding, and ultrasonic welding.

13. The assembly of claim 1 wherein the transition component includes a grommet and a transition body, the grommet including at least one internal cavity dimensioned for receiving an end of one of the at least one conductor and for receiving the first end of the at least one wire of the wire set, and the transition body having a cavity substantially enclosing the grommet and being welded to the probe body.

14. The assembly of claim 13 wherein the at least one internal cavity of the grommet includes a first portion and a second portion coupled in series with the first portion, the second portion having a cavity width greater than a cavity width of the first portion.

15. The assembly of claim 13, further comprising at least one electrical connector coupling the at least one conductor to the at least one wire at the coupled portion.

16. The assembly of claim 15 wherein the at least one electrical connector includes a first end compressively engaging the at least one conductor and a second end compressively engaging the at least one wire, the at least one electrical connector being positioned within the at least one internal cavity of the grommet.

17. The assembly of claim 16 wherein the at least one conductor is laser welded to the first end of the at least one electrical connector and the at least one wire is laser welded to the second end of the at least one electrical connector.

18. The assembly of claim 15 wherein the at least one electrical connector comprises a weldable metal.

19. A temperature sensor assembly comprising:
   a first temperature sensor probe having a first temperature sensor and a pair of first conductors coupled to the first temperature sensor, the pair of first conductors being configured to provide a first temperature signal indicative of a first temperature;
   a second temperature sensor probe having a second temperature sensor and a pair of second conductors coupled to the second temperature sensor, the pair of second conductors being configured to provide a second temperature signal indicative of a second temperature;

an adaptor circuit assembly fixedly coupled directly to the pair of first conductors and the pair of second conductors, the adapter circuit assembly having a first input configured to receive the first temperature signal and a second input configured to receive the second temperature signal, the adapter circuit assembly having an output for coupling to a temperature measurement system, the output being configured to provide a first temperature characteristic and a second temperature characteristic, the adapter circuit assembly having a circuit configured to receive the first temperature signal and generate the first temperature characteristic in response to the first temperature signal, the circuit being further configured to receive the second temperature signal and generate the second temperature characteristic in response to the second temperature signal.

20. The assembly of claim 1 wherein the temperature probe has a tip cap positioned proximate to the temperature sensor, the tip cap being welded about a first end of the probe body to enclose the temperature sensor within the probe body.

21. The assembly of claim 1, further comprising a cover covering at least a portion of the wire set.

22. The temperature sensor assembly of claim 19 wherein the first temperature sensor probe includes a first wire set having a pair of first wires, each first wire being coupled to a first conductor of the pair of first conductors to form a first coupling, and wherein the first temperature sensor probe further includes a first transition component coupled to an end of the first temperature sensor probe and having a first grommet with two channels, the channels each receiving one of the first conductors and one of the first wires, the first grommet enclosing the first couplings, and wherein the second temperature sensor probe includes a second wire set having a pair of second wires, each second wire being coupled to a second conductor of the pair of second conductors to form a second coupling, wherein the second temperature sensor probe further includes a second transition component coupled to an end of the second temperature sensor probe and having a second grommet with two channels, the channels each receiving one of the second conductors and one of the second wires, the second grommet enclosing the second couplings.

23. The temperature sensor assembly of claim 19 wherein the first sensor probe includes a first collar attached to the exterior of the first temperature sensor probe, a first connector rotatably coupled to the first temperature sensor probe and configured to engage the first collar and to secure the first temperature probe to a mounting assembly, and the second sensor probe includes a second collar attached to the exterior of the second temperature sensor probe, a second connector rotatably coupled to the second temperature sensor probe and configured to engage the second collar and to secure the second temperature probe to a mounting assembly.

24. The temperature sensor assembly of claim 19, further comprising a first lead for directly connecting the first probe to the adaptor circuit assembly and a second lead for directly connecting the second probe to the adaptor circuit assembly, the adapter circuit assembly further including a housing having integrated portions for fixedly retaining the first and second leads.

25. The temperature sensor assembly of claim 24 wherein the housing is a unitary housing and wherein the housing is molded about the first and second leads.

* * * * *